(12) United States Patent
Jong et al.

(10) Patent No.: US 10,594,535 B2
(45) Date of Patent: Mar. 17, 2020

(54) SYSTEM AND METHOD FOR EXTRACTING SATELLITE TO GROUND LINK QUALITY USING SATELLITE TELEMETRY SIGNAL AND LOW COMPLEXITY RECEIVER

(71) Applicant: Hughes Network Systems, LLC, Germantown, MD (US)

(72) Inventors: James Jehong Jong, North Potomac, MD (US); Santharam Gurumani, Frederick, MD (US); Channasandra Ravishankar, Clarksburg, MD (US)

(73) Assignee: Hughes Network Systems, LLC., Germantown, MD (US)

( * ) Notice: Subject to any disclaimer, the term of this patent is extended or adjusted under 35 U.S.C. 154(b) by 0 days.

(21) Appl. No.: 15/992,154

(22) Filed: May 29, 2018

(65) Prior Publication Data

US 2019/0372819 A1    Dec. 5, 2019

(51) Int. Cl.
*H04L 7/00* (2006.01)
*H04L 27/26* (2006.01)
(Continued)

(52) U.S. Cl.
CPC ..... *H04L 27/2669* (2013.01); *H04B 7/18517* (2013.01); *H04B 17/336* (2015.01); *H04W 72/0446* (2013.01)

(58) Field of Classification Search
CPC ... H04L 7/0029; H04L 7/005; H04L 27/2669; H03H 17/0642; H03H 17/0027;
(Continued)

(56) References Cited

U.S. PATENT DOCUMENTS

2002/0151286 A1 * 10/2002 Ruohonen ......... H04W 56/0035
455/182.2
2003/0016740 A1   1/2003 Jeske
(Continued)

FOREIGN PATENT DOCUMENTS

EP        2320593 A1    5/2011

OTHER PUBLICATIONS

International Search Report and Written Opinion dated Aug. 30, 2019 by the International Searching Authority (European Patent Office) in PCT Application PCT/US2019/034427.

*Primary Examiner* — Faisal Choudhury
(74) *Attorney, Agent, or Firm* — NovoTechIP International PLLC

(57) ABSTRACT

Disclosed methods of terrestrial station monitoring of downlink signal quality include receiving a sequence of samples of reference symbol slots of a downlink burst, and estimating a time offset between a local clock and a timing of a symbol pattern carried by the reference symbol slots, using a local copy of the reference symbol pattern. A corresponding time correction is applied to the sequence of samples to form time corrected samples of symbols carried by the reference symbol slots. A frequency offset between the time corrected samples of the symbols carried by the reference symbol slots and a local clock is estimated. A corresponding frequency compensation is applied to the time corrected samples, forming time/frequency compensated samples of the symbols carried by the reference symbol slots. A signal to noise plus interference ratio (SNIR) estimation data, and corresponding estimate of signal path, is generated, based on moments of the time/frequency compensated samples.

20 Claims, 11 Drawing Sheets

(51) Int. Cl.
  *H04W 72/04* (2009.01)
  *H04B 7/185* (2006.01)
  *H04B 17/336* (2015.01)
(58) Field of Classification Search
  CPC .... H04B 1/16; H04B 7/18517; H04B 17/336; H04W 72/0446
  USPC ......................................................... 370/316
  See application file for complete search history.

(56) References Cited

U.S. PATENT DOCUMENTS

| | | | |
|---|---|---|---|
| 2013/0023219 A1* | 1/2013 | Li | ........................... H04L 1/206 455/69 |
| 2013/0028175 A1 | 1/2013 | Jong et al. | |
| 2016/0285651 A1 | 9/2016 | Qi et al. | |
| 2016/0380792 A1 | 12/2016 | Colavolpe et al. | |
| 2018/0316482 A1* | 11/2018 | Gudovskiy | ........... H04L 7/0029 |

* cited by examiner

US 10,594,535 B2

SYSTEM AND METHOD FOR EXTRACTING SATELLITE TO GROUND LINK QUALITY USING SATELLITE TELEMETRY SIGNAL AND LOW COMPLEXITY RECEIVER

BACKGROUND

In satellite communication, a terrestrial station may monitor a received power and quality of a satellite downlink signal, for estimating the quality of the signal path between it and the satellite. The terrestrial station can use the estimate to adjust the power of its uplink signal to the satellite, enabling the satellite to receive the signal at a steady power level, irrespective of changing conditions of the signal path.

One technique for terrestrial station monitoring of downlink signal quality includes the satellite transmitting a Continuous Waveform (CW) pilot signal with the downlink. The CW pilot signal is easily recovered and analyzed at the terrestrial station. However, the CW pilot signal technique can have technical problems. One is that a CW signal is narrowband, and therefore, transmission sufficient for reliable reception at the terrestrial station can produce a high power spectral density. The high power density can create significant technical problems, e.g., interference of other communication channels, and practical problems, namely, regulatory limits on spectral power density.

Another technique for terrestrial station monitoring of downlink signal quality includes the station recovering the downlink symbol stream and estimating the signal quality from characteristics of that stream. However, this technique can have significant resource costs because the downlink signal can use complex modulation, in addition to being heavily encoded for error correction and being encrypted. Moreover, there can be applications requiring terrestrial station monitoring of downlink signal quality, without need for the information carried by the recovered symbols. In such applications, the resource cost of the symbol stream recovery can be an undesirable overhead.

Accordingly, there exists a technical need for low complexity, low cost, rapid, and accurate estimation of received signal power and quality.

SUMMARY

This Summary identifies example features and aspects and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

An example disclosed system for estimating a received signal quality, can include a memory, configured to store a reference symbol pattern, and can include a first processing engine, configured to receive a sampling sequence, corresponding to a sampling of reference symbol slots of a received signal burst, estimate a time offset between a local clock and a timing of symbols carried by the reference symbol slots, based at least in part on the stored reference symbol pattern and the sampling sequence, and time correct the sampling sequence to form a time corrected sample sequence of symbols carried by the reference symbol slots, based at least in part on the estimated time offset, and can include a second processing engine, coupled to the memory and to the first processing engine, and configured to: estimate a frequency offset between the symbols carried by the reference symbol slots and a local clock, based at least in part on the stored reference symbol pattern and the time corrected sample sequence, and frequency compensate the time corrected sample sequence, to generate a frequency/time compensated sample sequence, based at least in part on the time corrected sample sequence and the stored reference symbol pattern, and can include a third processing engine, configured to generate a signal to noise plus interference ratio (SNIR) data, based at least in part on a statistical moment of the frequency/time compensated sample sequence and, based at least in part on the SNIR data, generate an estimated received signal quality data.

An example disclosed method for estimating a received signal quality can include receiving a sampling sequence, corresponding to a sampling of reference symbol slots of a received signal burst; estimating a time offset between a local clock and a timing of symbols carried by the reference symbol slots, based at least in part on the stored reference symbol pattern and the sampling sequence; time correcting the sampling sequence to form a time corrected sample sequence of symbols carried by the reference symbol slots, based at least in part on the estimated time offset; estimating a frequency offset between the symbols carried by the reference symbol slots and a local clock, based at least in part on the stored reference symbol pattern and the time corrected sample sequence; frequency compensating the time corrected sample sequence, to generate a frequency/time compensated sample sequence, based at least in part on the time corrected sample sequence and the stored reference symbol pattern; and generating a signal to noise plus interference ratio (SNIR) data, based at least in part on a statistical moment of the frequency/time compensated sample sequence and, based at least in part on the SNIR data, generate an estimated received signal quality data.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

Figure 1:
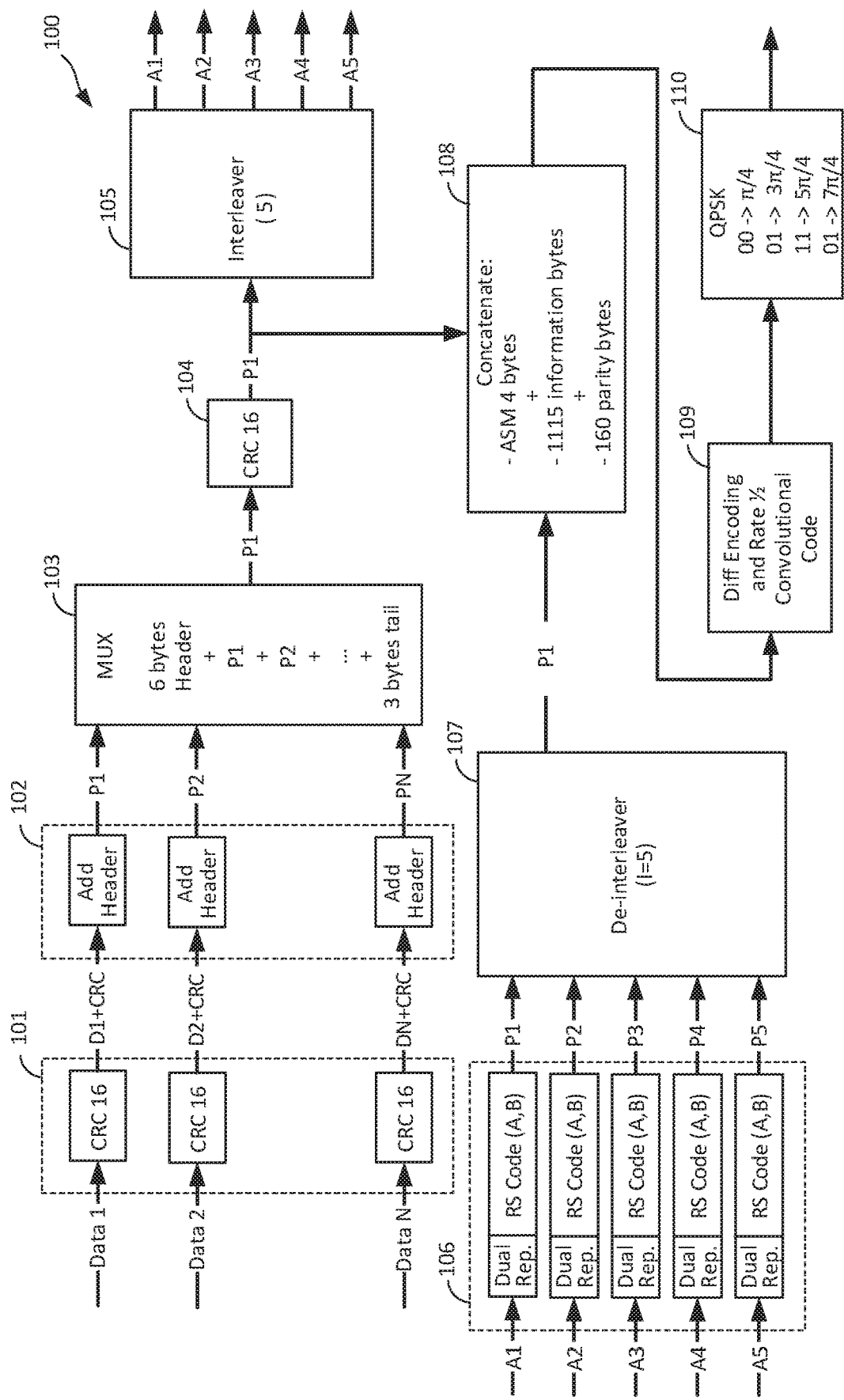
FIG. 1 is a logic diagram of an exemplary frame-type telemetry coding and modulation.

FIG. 1 is a functional block diagram of an exemplary frame-type telemetry (TM) encoder/transmitter 100. The TM encoder/transmitter 100 can provide TM frames for transmission, on a satellite forward downlink to a terrestrial station (not visible in FIG. 1). The terrestrial station can be, for example, a Very Small Aperture Terminal (VSAT). The downlink signal can be transmitted as bursts of a modulated radio frequency (RF) carrier, each burst being a frame of symbols that includes a header field carrying R of the symbols, and a payload field carrying S symbols, R and S being integers, and S being much larger than R.

Exemplary implementations of the TM frame encoder/transmitter 100 will described assuming, as an example protocol, the Consultative Committee for Space Data Systems (CCSDS) TM frame standard. This is only for purposes of example, and persons of ordinary skill, upon reading this disclosure, can readily adapt the various concepts and aspects illustrated by CCSDS examples to implementations using other frame protocols, standard or proprietary.

Referring to FIG. 1, the TM encoder/transmitter 100 can include a multi-channel cyclical redundancy coder (CRC) unit 101 that can be configured to receive N data streams, individually labeled "Data 1," Data 2," . . . "Data N," with "N" being an integer. The N data streams can be transmitted to the satellite, for example, by a forward uplink from a terrestrial satellite gateway (not visible in FIG. 1). The CRC unit 101 can apply CRC to the N data streams and output a corresponding N CRC-appended streams, individually labeled "D1+CRC," "D2+CRC," . . . "DN+CRC" (collectively referenced for description as "D+CRC," a label not appearing on FIG. 1). The CRC unit 101 operations are illustrated as boxes labeled "CRC RD," with "RD" representing the CRC code size. One example RD value, assuming the example CCSDS, can be 16.

The multi-channel CRC unit 101 unit can feed the N DX+CRC streams to a multi-channel header appending unit 102 that can be configured to add to each of the N streams a header (not explicitly visible in FIG. 1) and output corresponding N header prepended streams, labeled "P1," "P2," . . . "PN." The TM frame encoder/transmitter 100 can include an N:1 data stream multiplexer 103, which can be configured to receive the N header prepended streams P1, P2, . . . PN, and output these as a sequence of N streams, which can pass through CRC block 104, interleaver 105, Reed-Solomon encoders 106, de-interleaver 107, concatenation block 108, convolutional coder 109, and QPSK modulator 110 for transmission of a burst downlink signal. In an implementation, the concatenation block 108 can insert an Attached Synchronization Marker (ASM). In accordance with CCSDS protocol, the FIG. 1 ASM is illustrated as integer 4 symbols.

It will be understood that "multi-channel," as used herein in contexts such as "multi-channel CRC 101" and "multi-channel header appending unit 102," encompasses "multi-channel capable," and that "N" can be integer 1.

The FIG. 1 illustrated configuration parameters, such as CRC size, convolutional encoder rate, and specific Reed-Solomon coding, are only examples and are not to be understood as any limitations or indication of preference as to values of such parameters for practices according to this disclosure. Also, such parameter values can be application-specific, and their selection is not particular to practices according to this disclosure. Therefore, except for examples incidental to described operations, further detailed description of such parameter values is omitted.

Figure 2:
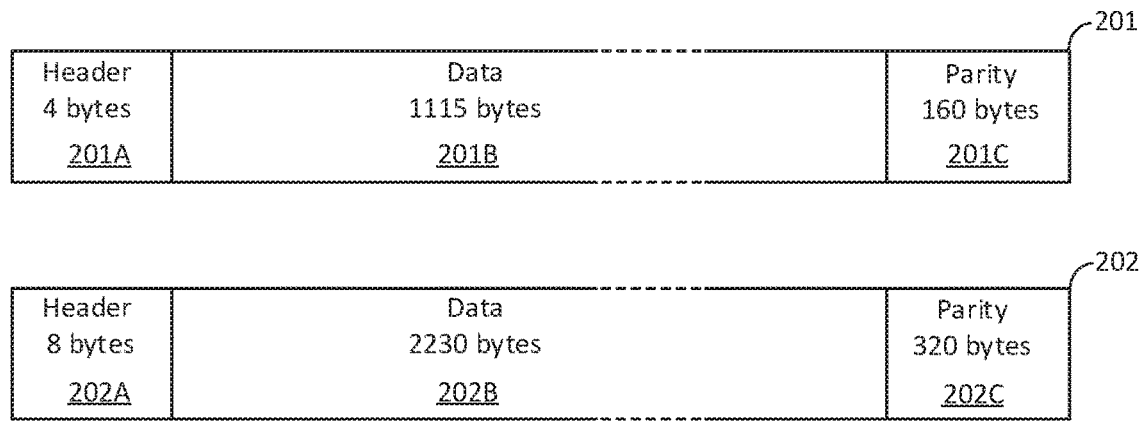
FIG. 2 illustrates an example pre-coded and post-coded frame.

FIG. 2 illustrates an exemplary pre-coded frame 201 and post-coded frame 202, where "pre-coded" and "post-coded" mean, respectively, prior to and after the rate 1/2 convolutional coding applied by the FIG. 1 logic block 109. The pre-coded frame 201 includes a pre-coded header 201A, a pre-coded payload or data field 201B, and a pre-coded parity field 201C, For purposes of example, the pre-coded header 201A is shown as extending integer 4 bytes, the pre-coded data field 201B as integer 1115 bytes, and the pre-coded parity field 201C as integer 160 bytes. By operation of the the rate 1/2 convolutional coding of block 109, the post-coded header 202A extends integer 8 bytes, the post-coded data field 202B has integer 2230 bytes, and the post-coded parity field 201C includes integer 320 bytes.

Figure 3:
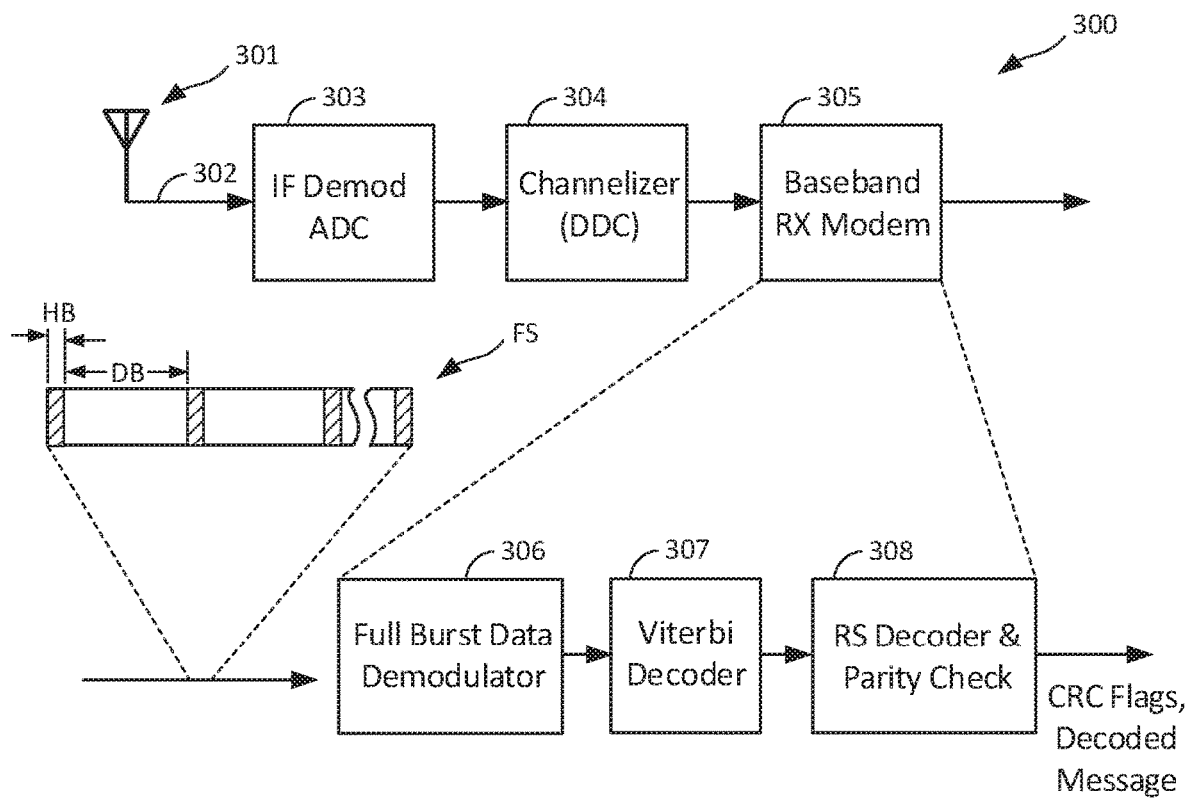
FIG. 3 is a functional block diagram of a downlink receiver with a full burst demodulation/decoding signal quality extraction.

FIG. 3 is a schematic diagram of relevant portions of a link receiver 300, for example, a terrestrial station within a satellite communication system (not visible in FIG. 1). The link receiver 300 can include an antenna 301 configured to receive, from a satellite, a radio frequency (RF) downlink signal, labeled "DL." The DL signal can be, for example, a quadrature phase shift keyed (QPSK) radio frequency (RF) carrier. An RF transmission line 302 can carry the received DL to an intermediate frequency (IF) demodulator and analog-to-digital converter (A/D) block 303 ("IF Demod and A/D block 303"), for down-conversion to an intermediate frequency (IF) and A/D sampling. The IF Demod and A/D block 303 can apply in-phase and quadrature down-conversion (not separately visible in FIG. 3) and A/D sampling, to output in-phase ("I") digital samples and quadrature ("Q") digital samples (collectively "I-Q samples") of the IF centered signal.

As described above, the DL signal can carry multiple TM channels, for example, via frequency division multiplexing (FDM). The IF Demod and A/D block 303 can sample at a rate sufficient to digitize all, or at least a plurality, of the TM channels. Accordingly, the receiver 300 can include a channelizer block 304 configured to receive the I-Q samples from the IF Demod and A/D block 303 and select, for example, via conventional techniques of digital band filtering and baseband translation, a desired one of the TM channels and feed, as baseband I-Q data, samples of the selected telemetry channel to a baseband RX modem block 305.

This example assumes the link receiver 300 is in an application that requires the receiver 300 to include a DL signal quality detection (QD) capability, configured to provide estimation of a reverse uplink path condition. This can be used, for example, by an uplink (UL) transmitter associated (not visible in FIG. 3) with the receiver 300, or by a controller of that transmitter, to control the transmitter's power.

In an application where inclusion of a CW pilot in the transmitter output from the transmitter may be unavailable, e.g., due to power flux density limits, as described above, the DL signal QD capability can be based on characteristics obtained from the recovered symbol stream, i.e., the entire burst. This can be termed "full burst demodulation/decoding" signal QD. For purposes of describing example operations and aspects of the full burst demodulation/decoding signal QD, description will assume a DL burst sequence FS, including a sequence of bursts. Each of the bursts in FS can be in accordance with the FIG. 2 TM protocol examples, or other protocol having a header region or field HB, and a payload region DB.

Provision of the full burst demodulation/decoding signal QD capability can correspond, in part, to the transmitter-applied modulation and codings described above in reference to FIG. 1. As described, such codings can include Reed-Solomon coding, as applied by the FIG. 1 Reed-Solomon coders 106, and convolutional code, as applied by the FIG. 1 differential encoding and rate 1/2 convolutional encoder 109, or equivalent. Accordingly, an implementation the full burst demodulation/decoding signal QD capability can include a full burst demodulator unit 307, feeding a Viterbi decoder 308, in turn feeding a Reed-Solomon decoder/parity check device 309. In an exemplary operation, assuming the FIG. 1 transmitter, the full burst demodulator device 307 can apply a QPSK demodulation that recovers the output of the FIG. 1 convolutional coder 109. The Viterbi decoder 308 can then recover the convolutional coded output of the FIG. 1 Reed-Solomon coders 106. Lastly, the Reed-Solomon decoder/parity check device 309 can recover the original data stream, e.g., Data1, Data2, . . . DataN.

Computation burden of preforming the above-described operations of the full burst demodulator unit 403, Viterbi decoder 308, and Reed-Solomon decoder/parity check device 309 can be high. Moreover, the burst sequence FS, as illustrated by FIG. 3, can include a concatenation of bursts, with no intervening or idle time. The computations must therefore be performed at the symbol rate of the burst.

Exemplary systems and methods according to this disclosure can provide, among other benefits and advantages, technical solutions to the above-described problems. Exemplary features can include providing an estimated downlink signal quality, and corresponding estimated propagation path quality, without a CW pilot signal and its associated problems such as spectral density limitations. Exemplary features can include far lower processing complexity and far lower computation burden than required for full-burst estimation techniques. Additional technical features can include no requirement for data sampling of the entire frame burst and, instead, needing only a sampling of a portion of the burst header.

System 400. Includes partial burst signal quality estimation and sync system 400. For brevity, "signal quality estimation" will be alternatively and interchangeably recited as "SQE." It will be understood that "SQE," as used herein, is an arbitrary abbreviation for "signal quality estimation" and does not import or otherwise carry any intrinsic meaning.

Various implementations of the partial burst signal quality estimation and sync system 400 are described in greater detail in subsequent sections of this disclosure. To avoid unnecessary description of a new environment, the system 400 and its implementations will be described assuming the above-described FIG. 3 IF Demod and A/D block 303 and channelizer block 304.

Figure 4:
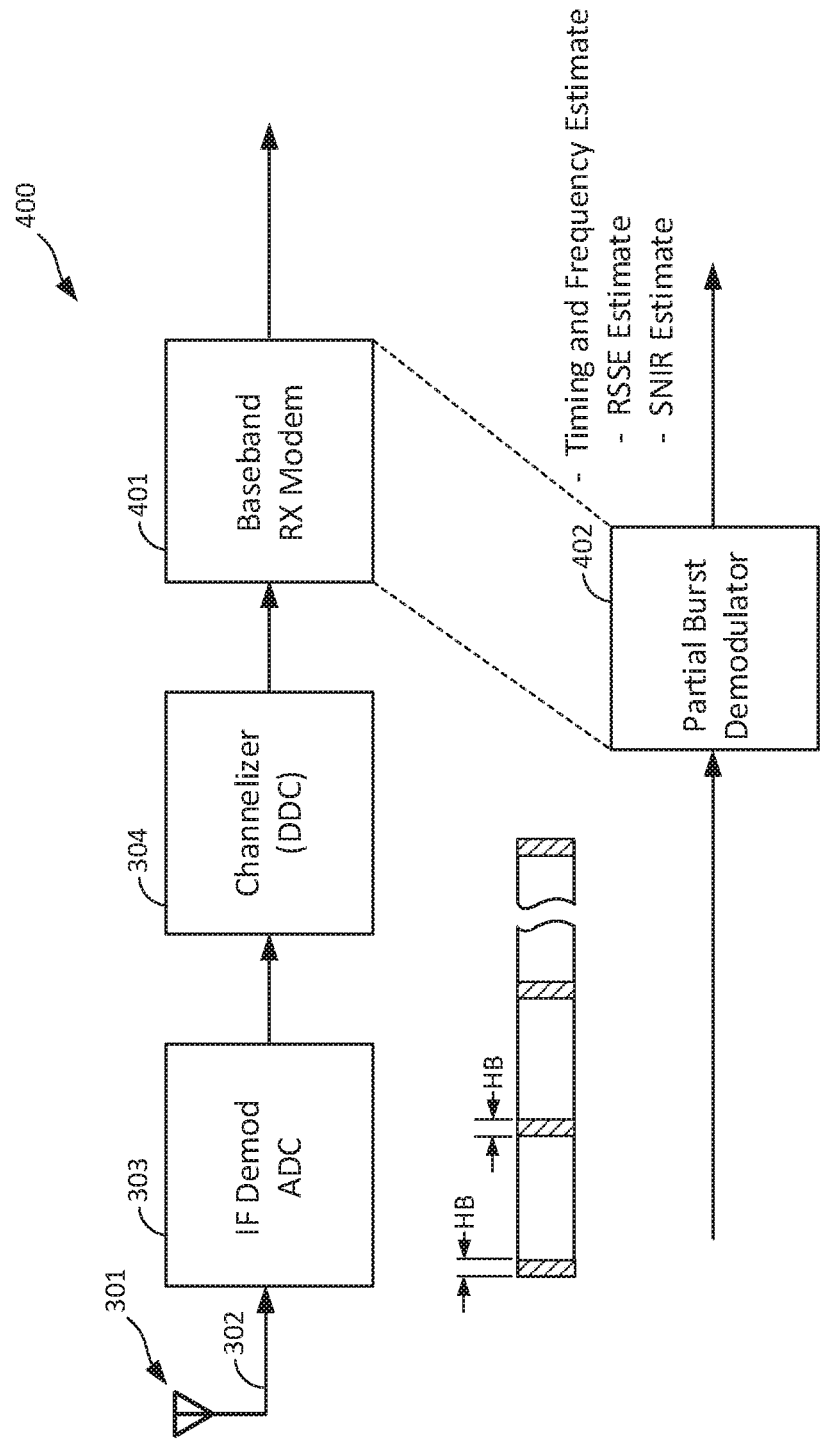
FIG. 4 is a high level schematic diagram of one exemplary receiver system that features a partial burst demod, signal quality estimation and tracking, in one or more implementations of systems and methods according to various aspects of the present disclosure.

Description assumes the system 400 receives and delivers to the partial burst SQE and sync system 401, frame bursts, each frame burst having a frame of symbols, arranged as a header and a payload, and the header carrying a representation of a reference pattern, e.g., a particular sequences or configurations of symbols, that can be inserted by the transmitter. The particular sequence or configuration of symbols will be referred to, for internal consistency, as a "reference symbol pattern." The number of symbols can vary. The partial burst SQE and sync system 401 can include memory resources that store a copy of the reference symbol pattern. In an aspect, the transmitter can insert the reference pattern prior to a coding, for example, a convolutional coding such as applied by the FIG. 1 differential coder/convolutional coder 109. Accordingly, in an implementation, the partial burst signal quality estimation and sync system 401 can store a pre-computed convolutional coded version (not separately visible in FIG. 4) of the reference symbol pattern.

In an implementation, the partial burst SQE and sync system 401 can be configured to accept and store the samples only for an interval, or sampling window, in which the reference symbol pattern will be present. Estimation of the sampling window can be provided by a synchronization logic that uses detection of the reference symbol pattern, and knowledge of a burst period. The span of the sampling window can be much shorter than the frame length, as it needs to encompass only the time range, relative to receipt of the frame start, during which the reference pattern can be received.

The partial burst SQE and sync system 401 can be configured to detect instances of the unique symbol pattern in the DL signal, and estimate a time offset between the received SL symbols and a local clock. The estimation can include cross-correlating the samples of the DL signal over the reference symbol pattern interval to the system's local copy of the reference symbol pattern. In an aspect, the system's local copy of the reference symbol pattern can be a convolutional coded version of the pattern. This can enable the transmitter to insert instances of the unique symbol pattern prior to a convolutional coding, for example, prior to the FIG. 1 convolutional coder 109. Upon generating the estimated time offset, the system 401 can apply a corresponding time offset correction.

Exemplary operations in processes on the system 401 can include determining an estimated frequency offset, between the DL symbol frequency and a local clock frequency, and applying a corresponding frequency correction, to generate a frequency/time corrected sample sequence of the received instance of the unique symbol pattern. Processes provided on the system 401 can include generating an estimated signal to noise plus interference ratio (SNIR), based at least in part on the frequency/time corrected sample sequence. Various examples of operations described above, are described in greater detail later in this disclosure.

In an implementation, the system 401 can apply, prior to the above-described time offset estimation and correction, a gain adjustment to the samples of the unique pattern interval of the DL signal.

Figure 5:
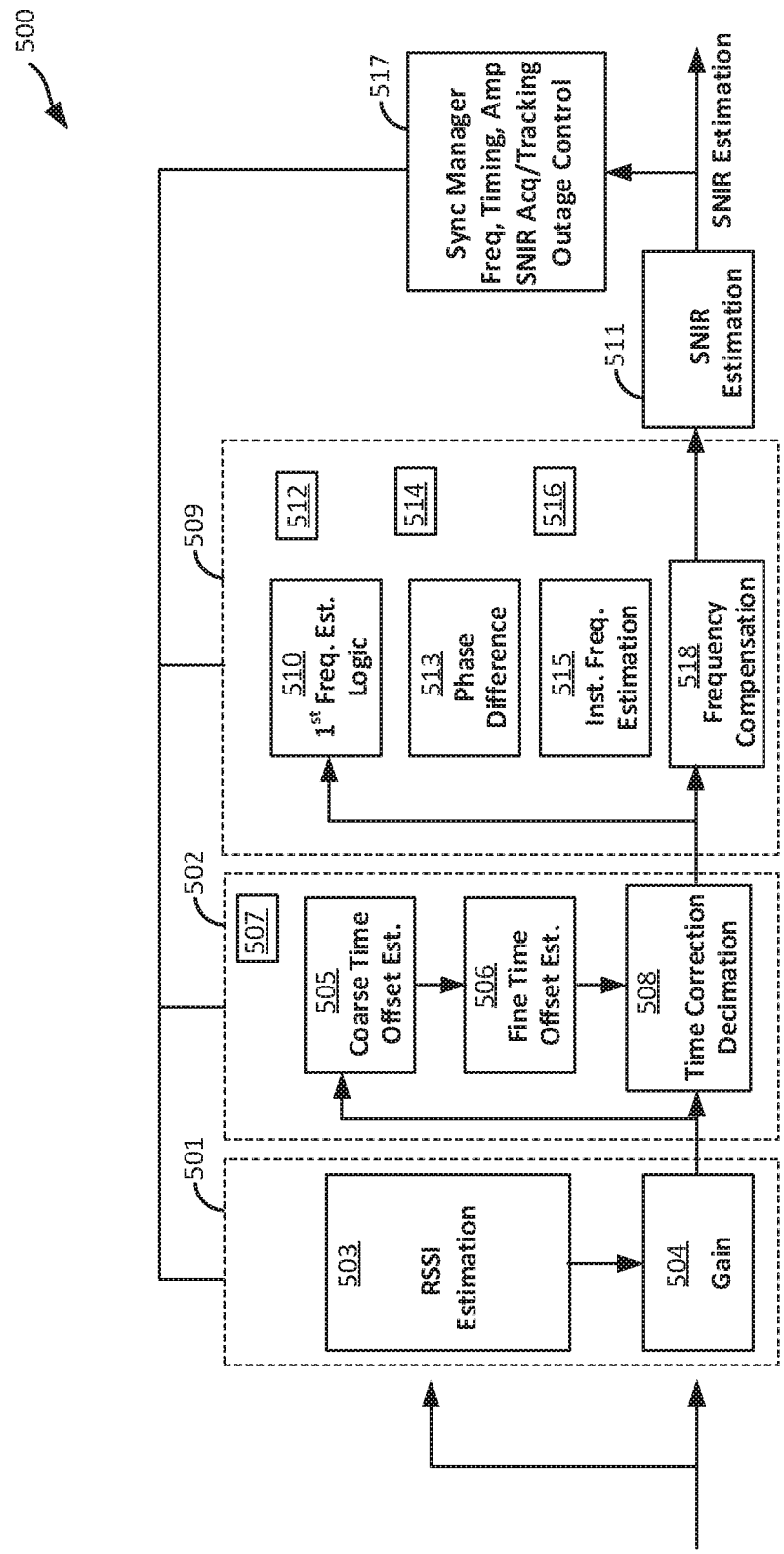
FIG. 5 is a schematic diagram of one or more exemplary implementations of systems and methods for partial burst demod, signal quality estimation and tracking, according to various aspects of the present disclosure.

FIG. 5 is a functional block diagram of one exemplary system implementation 500 of the burst SQE and sync system 401 described above. Description of exemplary operations assumes a set-up where the partial burst SQE and sync system 500 receives an output of the above-described FIG. 3 system 300 channelizer 302, and frame having a header and a payload, the header carrying the symbol pattern in a designated field of M symbols, which starts at a nominal symbol delay after the frame start. The A/D output will be referred to as "raw samples." The raw samples can be an oversampling of the received DL, having a sample rate, for example, that can be multiples of the symbol rate.

In some applications, for example, in practices of partial burst SQE and sync in accordance with this disclosure, in an environment of a terrestrial station of a low earth orbiting (LEO) satellite system, there may be non-trivial Doppler and delay uncertainty. Practices in such environments can include coarse removal of such non-trivial Doppler and delay uncertainty, prior to samples of the downlink signal being received, for example, at the partial burst SQE and sync system 500 or equivalent systems or methods providing partial burst SQE and sync in accordance with this disclosure. Techniques for removal of coarse doppler and delay from satellite downlink signals are known to persons of ordinary skill, and neither the selection among such techniques nor the implementation is necessarily specific to practices according to this disclosure. Therefore, further detailed description of such techniques is omitted.

Referring to FIG. 5, the partial burst SQE and sync system 500 can include a gain control engine 501, configured to receive a sequence of N raw samples indexed for example, as SWR(n), n=0 to N−1 (also collectively referenced "SWR.") The quantity N can correspond to the quantity of reference symbol slots in each burst, the oversampling rate applied by the IF Demod and A/D block 303, and a delay uncertainty, relative to the Sync signal, of the reference symbol slots. For example, assuming 32 reference symbol slots, an oversampling of 4 samples/slot, and a delay uncertainty of plus or minus one symbol slot, the quantity N would be integer 136.

The gain control engine 501 can then calculate a signal strength indicator (RSSI) data for SWR, and generate a gain adjustment, labeled "GT" based on the RSSI data. The gain control engine 501 can then multiply SWR by GT and output the sample sequence, labeled "SR," which can be received by a first processing engine 502 of the partial burst SQE and sync system 500. The above-described burst can be an instance in a sequence of DL bursts, and the above-described generation of RSSI can be repeated. Therefore, the term "instantaneous burst RSSI" will be used in certain instances in this description, for further specificity in associating an RSSI with a most recently received burst.

The gain control engine 501 can include an RSSI calculation logic 503 configured to generate an instantaneous burst RSSI for SWR(n), n=0 to N−1 SWR, according to Equation (1):

$$RSSI = \sum_{n=0}^{N-1} |R(n)|^2, \qquad \text{Equation (1)}$$

where,
n is the raw sampling sequence index, and
R (n) is the raw sample value at index n.

Alternatively, or optionally, the gain control engine 501 can be configured to apply a sub-sampling or decimation by D1 in generating RSSI, for example, to reduce computational load. In such as case, RSSI can be generated according to Equation (2):

$$RSSI = \sum_{n=0}^{B/D1} |R(D1n)|^2, \qquad \text{Equation (2)}$$

where,
R (D1n) is the raw sample value at index D1n, and
B is approximately N.

As an example, assuming D1 is integer 2, N to be the above-example integer 136 and plugging into Equation (2) yields the following Equation (3):

$$RSSI = \sum_{k=0}^{67} |R(2k)|^2 \qquad \text{Equation (3)}$$

Regarding the gain control factor, GC, in an implementation, the gain adjustment engine 501 can include a gain logic 504, configured to generate GC according to the following Equation (4):

$$GC = GT/\sqrt{RSSI} \qquad \text{Equation (4)}$$

where,
GT is a nominal amplitude target.

The gain logic 504 can be configured to multiply the raw sample sequence by the gain control factor and generate a corresponding SR(g), for g=1, 2, 3, . . . G−1 (collectively referred to, for brevity, as "sample sequence SR"). The "g" index schema is used instead of the "n" index schema because, in an implementation, the gain logic 504 can be configured to include an optional decimation. The decimation, if applied, will be referred to as a "first decimation" to distinguish from later-described decimations.

As described above, the system 500 can include a first processing engine 502, configured to receive the sample sequence SR, estimate a time offset between a local clock CK and the reference symbol slots of the DL, correct for the time offset, and output a corresponding time corrected sample sequence SC(k), for k=0 to K−1 (collectively referred to as "time corrected sample sequence SC" or "SC"). The first processing engine 502 can also be configured to apply a second decimation in generating SC. In an aspect, the second decimation and first decimation (if any) can be configured such that K is equal to the number of samples by which the system 500 stores its copy of the reference symbol pattern.

Referring to FIG. 5, the first processing engine 502 can include a coarse time offset estimation logic 505 and a fine time offset estimation logic 506. The coarse time offset estimation logic 505 can be configured with, or have access to, a first logic register 507 configured to store a local copy of the reference symbol pattern, labeled in FIG. 5 as "CRS." CRS can include M symbols. Assuming one sample per symbol, CRS can include M samples. The coarse time offset estimation logic 505 can be implemented as an index-level, cross correlation peak detector (not separately visible in FIG. 5), configured to determine a g index value at which a window within the sequence of G samples, SR(g), g=0, 1, . . . G−1, has a relative maximum cross-correlation with CRS. For purposes of description, that index value will be referred to as "index position of maximum cross-correlation." Exemplary operations in processes of determining the index position of maximum cross-correlation are described in greater detail later in this disclosure, for example, in reference to FIGS. 6 and 7.

The fine time offset estimation logic 506 can be configured to estimate a time position of maximum cross-correlation, between the M samples of CRS and SR(g), g=0, 1, . . . G−1 and, for example by a scaling, that can be the estimated time offset. The estimated time offset generated by the fine time offset estimation logic 506 can have a higher resolution than the SR sampling period. Exemplary operations in the interpolation can include finding a parabolic fit curve fit to the cross-correlation at the index position of maximum cross-correlation and the cross-correlation values determined for one or more adjacent index positions. Exemplary operations in such interpolations are described in greater detail later in this disclosure, for example, in reference to FIG. 7. The first processing engine 502 can also include a time correction logic 508, configured to apply a time-shift interpolation, based on the estimated time offset, and output a K sample time corrected sample sequence SC. Regarding SC sample rate, the logic 508 can be configured to apply a second decimation. In an implementation, a combination of the first decimation (if used) and second decimation can be configured such that SC has a sampling rate of one sample per reference symbol slot. K would therefore equal M, the number of symbols of the reference symbol pattern.

Referring to FIG. 5, the partial burst SQE and sync system 500 can include a second processing engine 509, which can be configured to receive the time corrected sample sequence SC, update a tracked frequency offset data formed by sampling and processing reference symbol pattern slots of preceding bursts, reflecting a historical frequency offset between a local clock CK and a transmitter clock. The second processing engine 509 can be configured to remove that updated frequency offset from the K samples and generate a corresponding time/frequency compensated sample sequence. The partial burst SQE and sync system 500 can also include an SNIR processing engine 510, which can be configured to estimate an SNIR of the DL, and hence uplink signal path quality, based on a processing of the time/frequency compensated sample sequence generated by the second processing engine 509. It will therefore be understood, from the description above, that systems and methods according to this disclosure can provide, among other features and benefits, estimation of DL SNIR and of uplink path quality, using samples only of the reference symbol slots of the DL signal.

Exemplary features of the second processing engine 509 will be further described. For convenience of description, a burst relative index (i) is introduced, wherein "i" means, in reference to a machine state or data value, the state or value as updated by the current burst, and "i−1" means the machine state or data value as last updated in association with an immediately preceding burst.

In an implementation, the second processing engine 509 can include a first frequency offset compensation logic 511, which can be configured to apply a current estimated frequency offset compensation to the current, $i^{th}$ burst, time compensated sample sequence SC, and generate an intermediate frequency/time compensated sample sequence, labeled SF. Operation of the first frequency offset compensation logic 511 can be comparable to removing the FS (i−1) offset from the time compensated sample sequence SC. The first frequency offset compensation applied by the logic 511 can be based on a current frequency offset FS (i−1) that may have been last updated in a processing on a preceding (i−1) burst. FS(i−1) can be stored in and retrieved from, for example, a second logic register 512, e.g., a virtual register maintained in a local memory (not explicitly visible in FIG. 5) of the engine 509, or another memory resource within or otherwise accessible by the system 500.

The second processing engine 509 can be configured to generate an instantaneous estimated frequency offset, by operations that can include estimating, as Theta(i), a phase of SF, for the ith frame, relative to the reference symbol pattern CRS and determining a difference between Theta (i) and the previous frame's phase, stored as Theta(i−1). Operations can also include generating the instantaneous estimated frequency offset based, at least in part, on the difference between Theta(i) and Theta(i−1). In an implementation, the second processing engine 509 can be configured to generate Theta(i) based, at least in part, on a correlation multiplication, and trigonometric operation, such as represented by the following Equations (5) and (6):

$$S(i) = RL(i) + jQ(i) = \sum_{a=1}^{M} SF(a)CRS^*(a) \qquad \text{Equation (5)}$$

where,
RL(i) is the real component of S(i),
jQ(i) is the quadrature component of S(i), and
CRS*(a) is the conjugate of CRS(a).

$$\text{Theta}(i) = \text{ArcTan}(Q(i)/RL(i)) \qquad \text{Equation (6)}$$

Exemplary operations in processes of determining Theta (i), e.g., according to Equations (5) and (6), are described in greater detail later in this disclosure. The second processing engine 509 can include a phase difference logic 513, configured to determine a difference between Theta(i) and Theta(i−1). The latter can be stored in and retrieved from, for example, a third logic register 514, e.g., another virtual register. To mitigate potential phase wrapping across the i$^{th}$ and (i−1)$^{th}$ frame, the phase difference logic 513 can be configured to determine the phase difference by multiplying the Equation (5) S(i) form of Theta(i) by the conjugate of the Equation (5) S(i−1) form of Theta(i−1), as described by the following Equation (7):

$$V(i)=S(i)S^*(i-1) \quad \text{Equation (7)}$$

An instantaneous estimated frequency offset logic 515 can be configured to generate the instantaneous estimate, Est_f, of the frequency offset by trigonometric operations such as described by the following Equations (8) and (9):

$$\Delta\theta = \frac{\text{Imag}V(i)}{\text{Real}(V(i))} \quad \text{Equation (8)}$$

$$\text{Est\_f} = \frac{\arctan(\Delta\theta)}{2\pi Tb} \quad \text{Equation (9)}$$

where,
Tb is the frame period.

Figure 9:
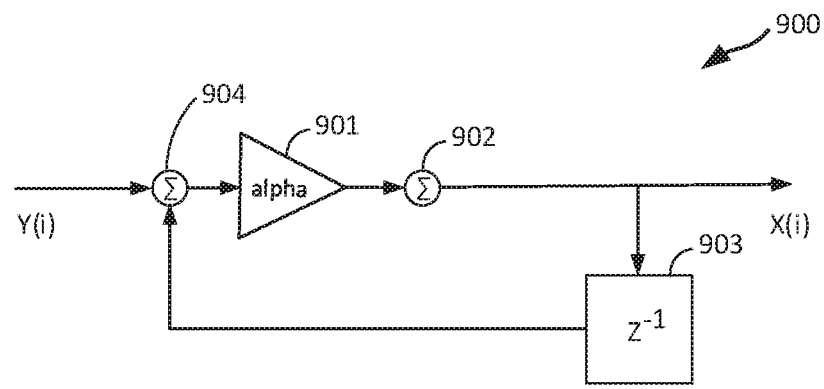
FIG. 9 is a logic schematic of an exemplary recursive filter, for implementations of tracking of signal quality parameters and metrics generated in exemplary processes in one or more implementations of systems and methods for partial burst demod, signal quality estimation, and tracking, according to various aspects of the present disclosure.

The second processing engine 509 can be configured to update the current estimated frequency offset FS (i−1), stored in second logic register 512, based at least in part on the instantaneous estimate, Est_f generated by the logic 515. The updated value of FS (i−1) will be the current frequency offset FS (i−1) for the next DL burst, i.e., the i+1 frame. In an aspect, FS (i−1) can be an output of a frequency offset tracking filter 516, which can provide resilience to events such as intermittent terrestrial interference to the DL signal. FIG. 9 illustrates a one-pole recursive filter 900 that can be configured to implement the frequency offset tracking filter 516. In an alternative or supplemental implementation, the frequency offset tracking filter 516 can be performed by a tracking/acquisition logic 517. Configuration of the one-pole recursive filter 900, for implementing the frequency offset tracking filter 516 if included in the engine 509, or an equivalent tracking filter in the tracking/acquisition logic 517, is described in greater detail in later paragraphs.

The second processing engine 509 can also include a frequency compensation logic 518, configured to remove the updated current estimated frequency offset from the intermediate frequency/time compensated sample sequence SF, and generate a corresponding frequency/time compensated sample sequence SP.

As described above, the partial burst SQE and sync system 500 can include an SNIR processing engine 510, configured to determine an estimated SNIR, based at least in part on the frequency/time compensated sample sequence SP. The SNIR engine 510 can be configured to generate the estimated SNIR as a dB value, according to the following Equations (10)-(12):

$$M1 = \frac{1}{M}\sum_{m=0}^{M-1} SP(m)^2 \quad \text{Equation (10)}$$

$$M2 = \frac{1}{M}\sum_{m=0}^{M-1} (SP(m) - M1)^2 \quad \text{Equation (11)}$$

$$SINRdB = 10\log\frac{(M1)^2}{M2 - (M1)^2} \quad \text{Equation (12)}$$

where
M1 is the first moment, or average, of the SP sequence, and
M2 is the second moment, or variance, of the SP sequence.

In an implementation, the partial burst SQE and sync system 500 can include an SNIR tracking filter that, using a filter such as the first order recursive filter of FIG. 9, configured differently from the above-described recursive filter 516, can maintain a tracked M1 and a tracked M2. The SNIR tracking filter can be included in the SNIR processing engine 510 or can be included in the tracking/acquisition logic 517. Configuration of the one-pole recursive filter 900, for implementing the SNIR tracking filter if included in the engine 510 or in the tracking/acquisition logic 517, is described in greater detail in later paragraphs.

As described above, the partial burst SQE and sync system 500 can include a synchronization and tracking/acquisition logic 517. The synchronization and tracking/acquisition logic 517 can be configured to filter and track the estimated RSSI generated by the gain control engine 501, and to track the estimated timing offset generated by the first processing engine 502, and the current estimated frequency offset FS (i−1) generated by the second processing engine 509. The logic 517 can also be configured track the estimated SNIR. Each of the tracking functionalities can be implemented by a corresponding configuration of the on-pole recursive filter 900 illustrated in FIG. 9. In an implementation, the synchronization and tracking/acquisition logic 517 can be configured to detect outages during tracking and, based on such detection, to control a tracking loop. The logic 517 can also be configured to control the partial burst SQE and sync system 500 to operate in a tracking mode until a higher level controller (not explicitly visible in FIG. 5) configures the system 500 to an acquisition mode. The synchronization and tracking/acquisition logic 517 can be configured to detect an outage based on the tracked SNIR. Specific configuration as to an outage detection condition of the tracked SNIR can be application specific. One non-limiting example can be a detection of the tracked SNIR falling below a pre-configured threshold value, TR, for an integer CF consecutive frames. One non-limiting exemplary value of TR can be approximately −1.5 dB, and one non-limiting example of CF can be integer 10. 10 consecutive frames. It will be understood that these numerical values are only for purposes of example, and are not intended as a limitation, and are not intended as a statement or implied statement of preference for practices according to this disclosure.

The synchronization and tracking/acquisition logic 517 can be configured to respond to detection of an outage by freezing or terminating the SNIR tracking loop and causing the system 500 to free run until, for example, receipt of an acquisition mode command or equivalent, e.g., from a higher level processing. In an implementation, the synchronization and tracking/acquisition logic 517 can be configured such that, in the acquisition mode, the first processor engine 502 or another system resource receives a continuous A/D sampling stream from the FIG. 4 channelizer 302 and, for example, by applying a variation of the above-described coarse estimation of time offset, searches for an instance of the reference symbol pattern.

It will be understood that "engine," "processor engine," and "logic," as used herein, are functional terms that refer to functional resources, which are graphically represented as logic blocks, structured and configured to perform described processes, tasks, operations, and functionalities and, except where expressly stated otherwise or clearly implied by context to be otherwise, without limitation as to any particular hardware, technology, or architecture, or any particular allocation or distribution of functions, operations, or tasks among or between hardware and software, or to any particular geographical location of resources.

Figure 6:
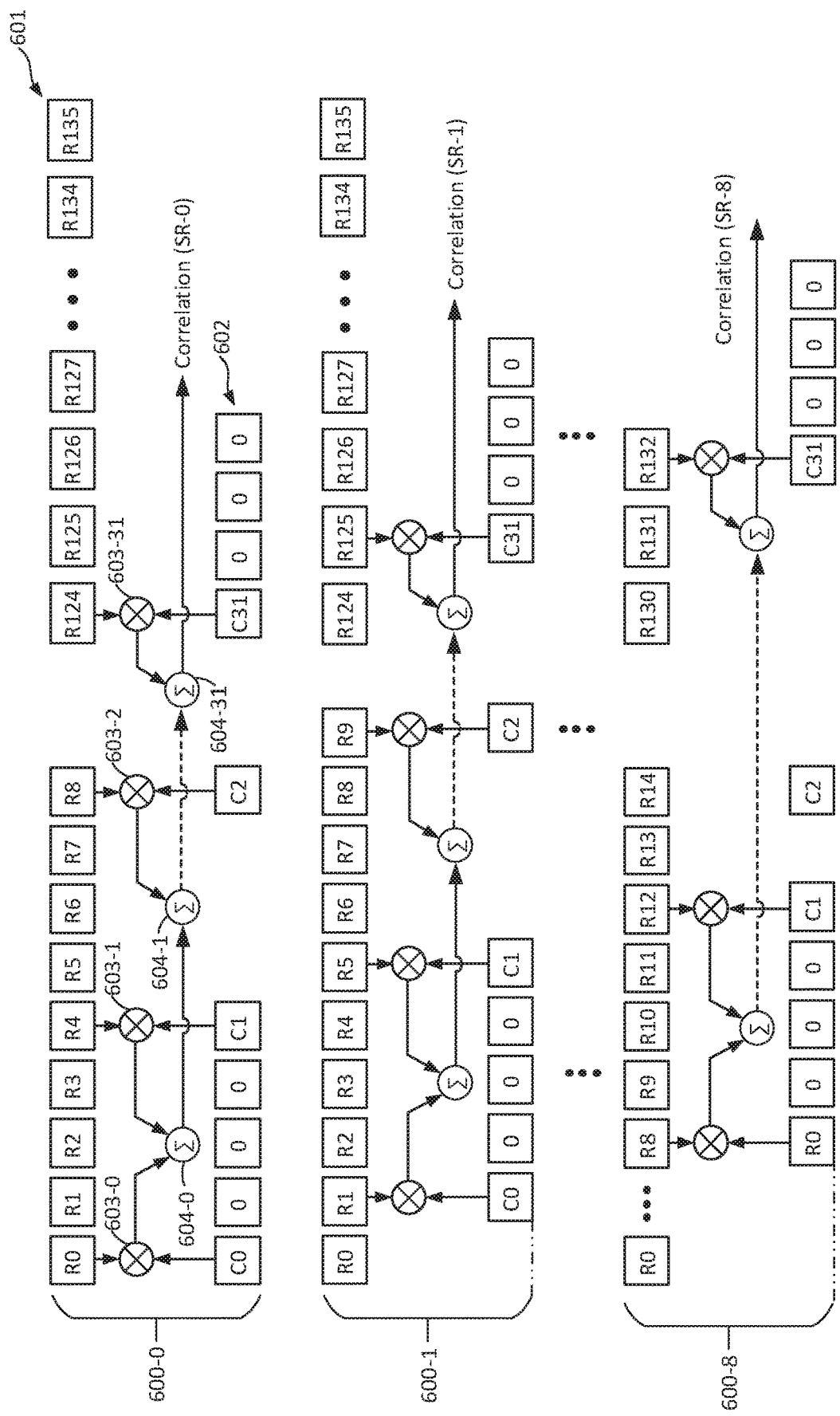
FIG. 6 illustrates exemplary operations, by representative machine state snapshots, in an exemplary cross-correlation process, in one or more implementations of systems and methods for partial burst demod, signal quality estimation, and tracking, according to various aspects of the present disclosure.

FIG. 6 illustrates, as representative snapshots 600-0, 600-1, and 600-8, exemplary operations in a coarse estimation of time offset that can be performed, as described above, by the FIG. 5 first processing engine 502. As described, the operations can include a determination of the index position, within the SR(g), g=0 to G−1 sample sequence, of maximum cross-correlation to the reference symbol pattern CRS stored in first logic register 506. Description of the snapshots 600-0, 600-1, and 600-8 and respective operations illustrated will also reference FIG. 5 for further illustrative perspective. To avoid introducing new parameter values, description will assume the above-described 32-symbol reference symbol pattern, and a G value of 136 samples, based on 4 samples per each of 32 symbol slots in each DL burst, and a delay uncertainty of plus or minus 1 symbol slot. Referring to FIG. 6, at snapshot 600-0 the 136 samples, SR(g), g=0 to 135, have been loaded into a first logic register file 601, which can function, in a logic sense, as a first serial-in, parallel-out 136-tap register. The 136 register taps are labeled R0, R1, . . . R135. Sample SR(0) can be in register tap R0, sample SR(1) in register tap R1, and so on, through sample SR(135) being in register tap R135. Also, at snapshot 600-0, the 32 symbol CRS has been loaded into second logic register file 602. The second logic register file 602 is illustrated as a parallel-out 128-tap register, with 32 symbols, spaced apart by integer 4 increments of the "g" index. The graphic illustration of the spacing provides convenient illustration of alignment with corresponding register taps of the first logic register file 601. The second logic register file 602 can implemented, for example, without the illustrated inter-symbol spacing tap registers.

FIG. 6 assumes stepping the 32-sample content of the second logic register file 602 at one index increment per step, and at each increment performing a correlation multiplication. The correlation multiplication, for the illustrated example, includes a sum of 32 products, with the products represented as multipliers 603-0, 603-1, . . . 603-31 (collectively "multipliers 603"), and the 32 summations represented as adders 604-0, 604-1, . . . 604-31 (collectively "adders 604"). It will be understood that the multipliers 603 are not necessarily implemented as 32 discrete multiplier devices and, instead, can be implemented as a single processing resource performing, for example, a sequence of 32 multiplications. Likewise, the 32 adders 604 can be the single processing resource performing each multiplication as a multiply-accumulate.

Operations in the correlation multiplication at snapshot 600-0 can include a multiplication of sample 0 of the CRS, in register tap C0 of the second register file 602 by SR(0) in register tap R0 of the first register file 601, a multiplication of sample 1 of the CRS, in register tap C1 (spaced four taps from C0) of the second register file 602 by SR(3) in register tap R0 of the first register file 601, and so on, though multiplication of sample 31 of the CRS, in register tap C31 (spaced four taps from C30) of the second register file 602 by SR(124) in register tap R124 of the first register file 601. The 32 summations, represented by the 32 adders 604, generate the correlation value at index position 0.

Operations in the correlation multiplication at snapshot 600-1 are the above-described operations with the CRS samples slid one index position to the right, such that the 32 summations by the 32 adders 604 generate the correlation value at index position 1. The process continues for 7 more iterations, and ends as illustrated by snapshot 600-8, with the CRS samples being integer 8 index positions to the right of their position at snapshot 600-0. The 32 summations by the 32 adders 604 at 600-8 generate the correlation value at index position 8.

Figure 7:
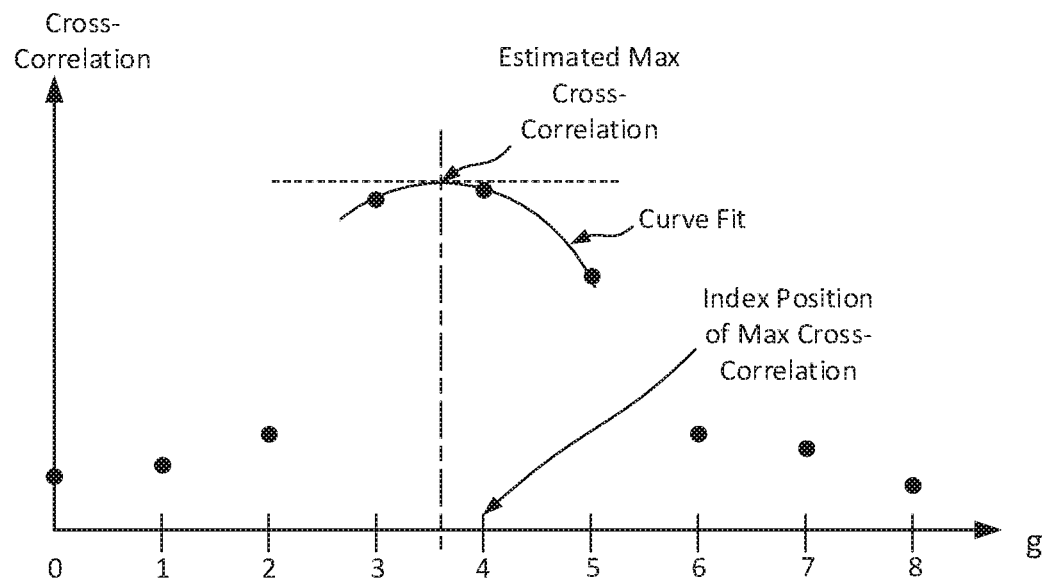
FIG. 7 illustrates representative cross-correlation data of a type that can be generated by exemplary operations in a process as illustrated in FIG. 6, in one or more implementations of systems and methods for partial burst demo signal quality estimation, and tracking, according to various aspects of the present disclosure.

FIG. 7 illustrates representative cross-correlation data of a type that can be generated by exemplary operations in a process as illustrated in FIG. 6, illustrating an example type of index position of maximum cross-correlation, and illustrating a type of interpolation that can be applied in a fine estimation of time offset, in one or more implementations of systems and methods for partial burst demo signal quality estimation, and tracking, according to various aspects of the present disclosure.

Figure 8:
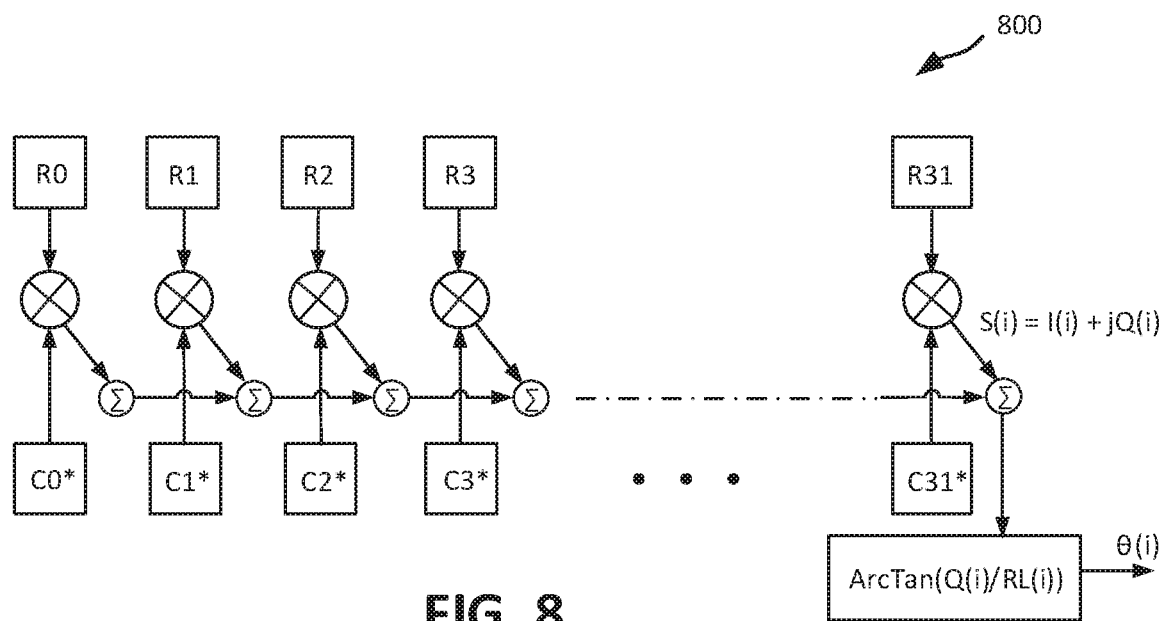
FIG. 8 illustrates exemplary operation in an exemplary process of estimating instantaneous estimated phase, in one or more implementations of systems and methods for partial burst demod, signal quality estimation, and tracking, according to various aspects of the present disclosure.

FIG. 8 illustrates exemplary operation in an exemplary process 800 of estimating instantaneous estimated phase, in one or more implementations of systems and methods for partial burst demod, signal quality estimation, and tracking, according to various aspects of the present disclosure. The exemplary operation illustrated in FIG. 8 is a specific example of operations in accordance with Equations (5) and (6), described above, with an example CRS having 32 symbols, i.e., M is integer 32. The corresponding form of Equation (6) can be represented by the following Equation (13):

$$S(i) = RL(i) + jQ(i) = \sum_{a=0}^{31} SF(a)CRS^*(a) \qquad \text{Equation (13)}$$

FIG. 9 is a logic schematic of an exemplary recursive filter 900, for implementations of tracking of signal quality parameters and metrics generated in exemplary processes in one or more implementations of systems and methods for partial burst demod, signal quality estimation, and tracking, according to various aspects of the present disclosure.

The filter 900 can include a forward gain block 901, a forward summing block 902, a one-clock delay block 903, and a feedback difference block 904. The configuration can include setting the Alpha factor for the functionality of the tracking filter being implemented. For example, implementing an RSSI tracking filter for the synchronization and tracking/acquisition logic 517 can include setting the Alpha factor for the functionality of an RSSI tracking filter. Implementing an estimated frequency offset tracking filter, to operate as the current frequency offset tracking filter 516 or a tracking by the tracking/acquisition logic 517, can include setting Alpha to a corresponding value.

Specific settings of Alpha for the above-described functionality can be application-specific but can be readily determined by persons of ordinary skill having possession of this disclosure, without undue experimentation. Table I shows non-limiting examples, for configuring a filter according to 900 as an implementation of the above-described tracking filters. It will be understood that the values are only for purposes of example, are not intended as a limitation, and are not intended as a statement or implied statement of preference as to values in practices according to this disclosure.

TABLE I

| | |
|---|---|
| RSSI Tracking | .01 |
| SNIR Tracking | .05 |
| Frequency Tracking | .3 |
| Timing Tracking | .06 |

Figure 10:
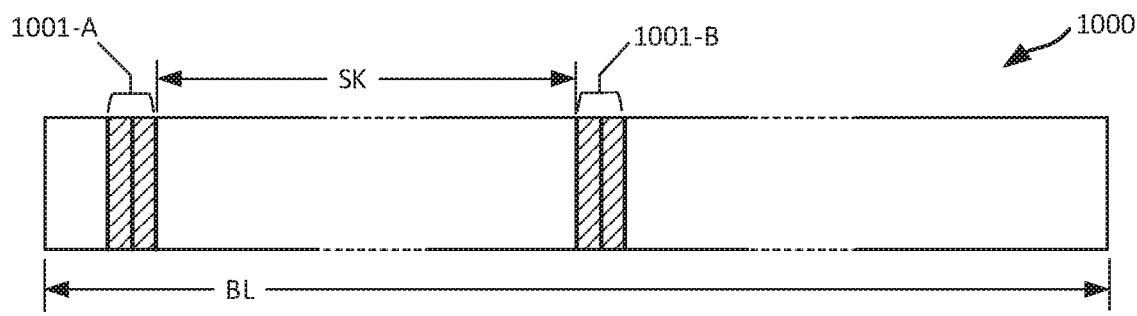
FIG. 10 illustrates one example alternative configuration of reference sample slots in an example frame protocol according to one or more implementations of systems and methods for partial burst demod, signal quality estimation, and tracking, according to various aspects of the present disclosure.

FIG. 10 illustrates one exemplary alternative configuration 1000 of reference sample slots in an example frame protocol according to one or more implementations of systems and methods for partial burst demod, signal quality estimation, and tracking, according to various aspects of the present disclosure.

Referring to FIG. 10, the configuration 1000 includes a burst of burst length BL, having integer 4 reference symbol slots, i.e., M being integer 4, separated into 2 segments, illustrated as a reference symbol first slot segment 1001-A and a reference symbol second slot segment 1001-B. In this example, both of the segments 1001-A and 1001-B have the same number of reference symbol slots, which is illustrated as integer 2. It will be understood that 2 segments, and integer 2 reference symbol slots per segment, are only examples, and are not intended as any limitation, or as a statement or implied statement of preference in practices according to this disclosure. The spacing between reference symbol first slot segment 1001-A and reference symbol second slot segment 1001-B is SK slots. The SK slots can be payload slots. In an implementation, assuming an oversampling by 4, the FIG. 5 gain control engine 501 can be configured receive a sequence of integer 8 raw samples of the reference symbol first slot segment 1002-A, and another integer 8 raw samples of the reference symbol second slot segment 1002-B. The gain control engine 501 can then concatenate the 16 samples into an example SWR sequence of 16 samples. Assuming a delay uncertainty of one slot, the sample sequence for each of the 2 segments can include 16 samples. Accordingly, the gain control engine 501 can form a concatenated sequence of 32 samples, as the SWR sequence.

Figure 11:
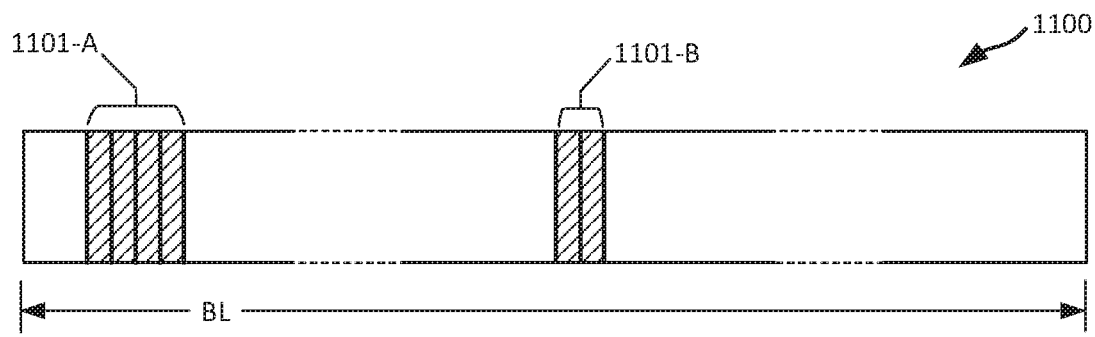
FIG. 11 illustrates another example alternative configuration of reference sample slots in an exemplary frame protocol according to one or more implementations of systems and methods for partial burst demod, signal quality estimation, and tracking, according to various aspects of the present disclosure.

FIG. 11 illustrates another exemplary alternative configuration 1100 of reference sample slots in an exemplary frame protocol according to one or more implementations of systems and methods for partial burst demod, signal quality estimation, and tracking, according to various aspects of the present disclosure. The configuration 1100 illustrates a burst that includes integer 6 reference symbol slots, separated into 2 segments, labeled as reference symbol first slot segment 1101-A and reference symbol second slot segment 1101-B. In this example, the 2 segments have mutually different quantities of reference symbol slots, namely 4 slots and 2 slots, respectively. It will be understood that 2 segments, and integer 4 reference symbol slots in the first segment and integer 2 reference symbol slots in the second segment are only examples, and are not intended as any limitation, or as a statement or implied statement of preference in practices according to this disclosure. In an implementation, assuming an oversampling by 4, the FIG. 5 gain control engine 501 can be configured receive a sequence of integer 16 raw samples of the reference symbol first slot segment 1101-A, and integer 8 raw samples of the reference symbol second slot segment 1101-B. The gain control engine 501 can then concatenate the 24 samples into an example SWR sequence of 24 samples. Assuming a delay uncertainty of one slot, the sample sequence of the first segment can include 24 samples, and the sample sequence of the second segment can include 16 samples. The gain control engine 501 can therefore form a concatenated sequence of 40 samples as the SWR sequence.

Figure 12:
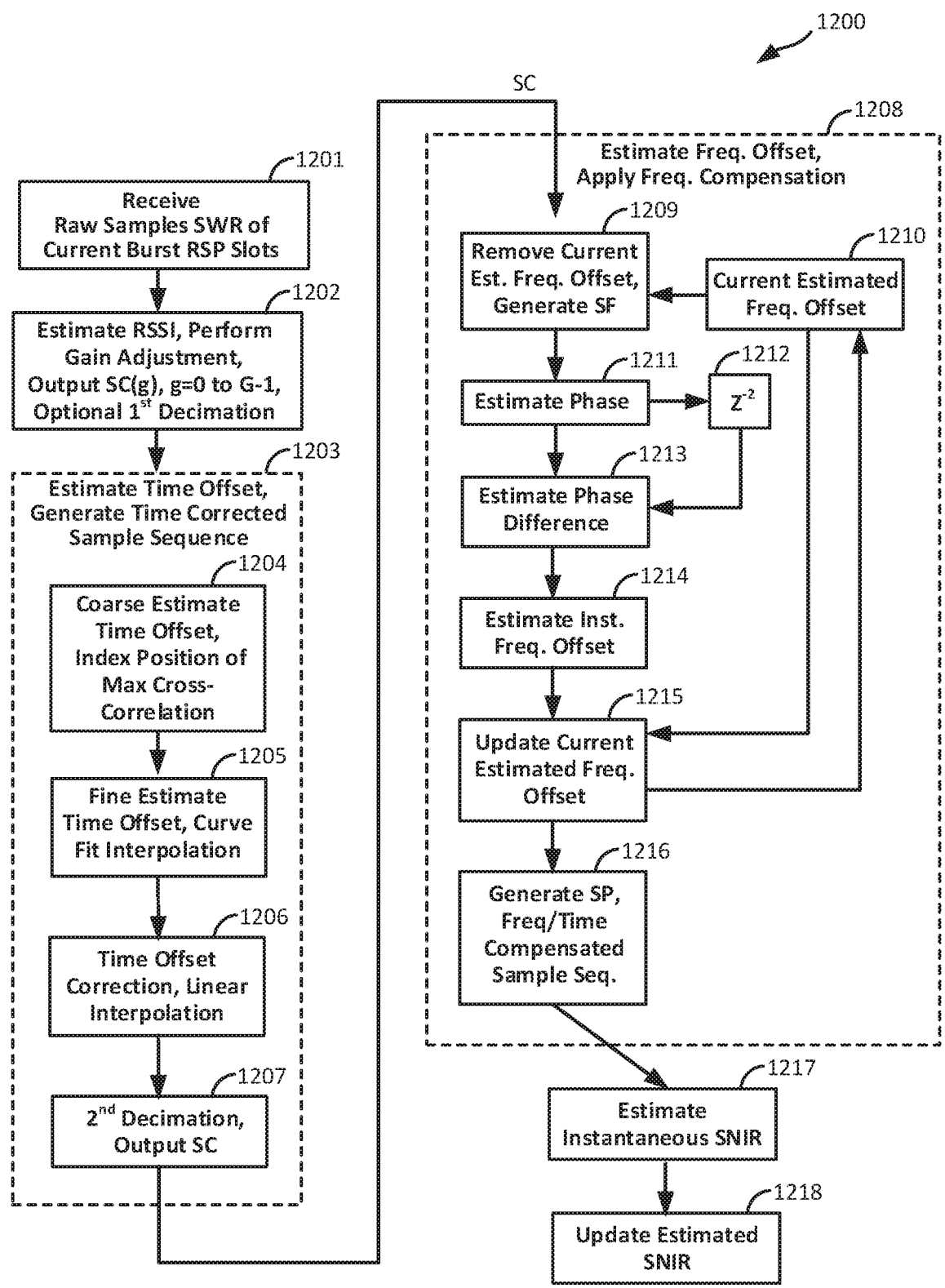
FIG. 12 illustrates a flow of exemplary operations in a process of partial burst demod, signal quality estimation and tracking, in one or more implementations of systems and methods according to various aspects of the present disclosure.

FIG. 12 illustrates a flow 1200 of exemplary operations in a process of partial burst demod, signal quality estimation and tracking, in one or more implementations of systems and methods according to various aspects of the present disclosure. An exemplary instance of the flow 1200 can start at 1201, with receiving a sampling sequence, corresponding to a sampling of reference symbol slots of a received signal burst. Referring to FIG. 5, an example of operations at 1201 can include the gain control engine 501 receiving the raw sample sequence SWR, from samples as gain adjusted raw samples from the FIG. 4 channelizer 203. An exemplary instance of the flow 1200 can proceed from 1201 to 1202 and apply operations of estimating the RSSI and, based on the estimated RSSI, update a gain control factor, then output a gain adjusted sampling sequence. Referring to FIG. 5, an example of operations at 1202 can include the gain control engine 501 determining an estimated RSSI, according to Equations (2)-(4) and multiplying the raw sample sequence SWR by the gain control factor GC to generate the gain adjusted sample sequence SR(g), g=0 to G−1. An exemplary instance of the flow 1200 can proceed from 1202 to 1203 and apply operations for estimating a time offset between a local clock and a timing of symbols carried by the reference symbol slots and applying corresponding time correction. Exemplary operations at 1203 can include operations at 1204 for coarse time offset estimation. Operations at 1204 can include determining an index position of maximum correlation, as described above in reference to FIG. 6 and the FIG. 5 first processing engine 502, determining a maximum cross-correlation of the reference symbol pattern and the sampling sequence. An exemplary instance of the flow 1200 can proceed from 1204 to 1205, where operations of fine estimation of time offset can be applied, to generate an estimated time offset. Exemplary operations at 1205 can include first processing engine 502 applying a curve-fit interpolation, described above in reference to FIG. 7. In an aspect, operations at 1205 can include generating the estimated time offset a recursive filter tracking, based on the described interpolation and an estimated time offset as updated in response to a previous burst. The recursive filter update at 1205 can be performed, for example, by a particular time offset tracking configuration of the FIG. 9 one-pole recursive filter 900, implemented either in the first processor engine 502, or in the synchronization and acquisition/tracking logic 517.

Referring to FIG. 12, upon determining the updated estimated time offset at 1205, an exemplary instance of the flow 1200 can proceed to 1206 and apply operations of a time shift correction. The operations at 1206 can include, for example, a linear interpolation of the gain-adjusted sample sequence SR, using the updated estimated time offset. In an implementation, a second decimation 1207, illustrated in FIG. 12 as a separate block, can be performed within, or after the time shift correction operations at 1206. A result of operations at 1206/1207 result can be a time-corrected sampling sequence SC. The sample rate of SC can be, but is not necessarily, the same as the sample rate, e.g., one sample-per-symbol, by which CRS is stored in the system 500. In an example instance of the flow 1200, operations can proceed from 1207 to 1208, where operations can be applied for estimating an updated frequency offset between the transmitter clock and the local clock and then, based on the updated estimate, frequency compensating the time-corrected sampling sequence SC to output the frequency/time compensated sample sequence SP. Exemplary operations at 1208 can be according to examples described above in reference to the FIG. 5 second processor engine 509, in receiving the time corrected sample sequence SC from the first processing engine 502 and generating SP for subsequent processing by the SNIR processing engine 509.

In an implementation, operations at 1208 can include operations applied, at 1209, for removing a current estimated frequency offset 1210 from the time corrected sample sequence SC, to generate the intermediate frequency/time compensated sample sequence SF. The current estimated frequency offset 1210 applied at 1209 can be a result of a previous burst updating, as described above, in reference to the second processing engine 502. Additional examples of the updating are described in greater detail in paragraphs below. An exemplary instance of the flow 1200 can proceed from 1209 to 1211 where operations for estimating a phase of the sample sequence SF relative to the reference symbol pattern CRS can be applied. Operations in the phase estimating at 1211 can, for example, be according to the correlation multiplication described above in reference to Equations (5) and (6). The CRS value used at 1211 can be, for example, the CRS stored in the first logic register 506, as also described above. Associated with the estimation of phase at 1211, operations can include storage at 1212 of the estimate for use in processing the sample sequence SF generated in response to a next, i.e., i+1, burst. The storage at 1212 can be performed, for example, by shifting the phase estimated at 1211 into a 2 sample depth first-in-first-out (FIFO) (not separately visible in FIG. 12), or equivalent. This can also shift to the output of the FIFO the phase estimated at 1211 in response to the immediate preceding, i.e., i−1, burst.

Referring to FIG. 12, in an exemplary instance of the flow 1200 operations can proceed from 1211/1212 to 1213, where operations can be applied for estimating a phase difference, the difference being between the phase estimated at 1211 for the current burst and the phase, from the above-described storage at 1212, estimated at 1211 for the preceding, i.e., i−1, burst. Operations at 1213 can include, for example, multiplying by the second processing engine 509 of an I-Q form of the current estimated phase, obtained at 1211, by a conjugate of an I-Q form of the preceding burst phase from 1212, e.g., as described above in reference to Equation (7). In an exemplary instance of the flow 1200, operations can proceed from 1213 to 1214, where operations can be applied to generate an instantaneous frequency offset—meaning not a recursive filter updated frequency update. Exemplary operations at 1214 can be according to Equations (8) and (9), as described above in reference to operations by the second processing engine 509. An exemplary instance of the flow 1200 can proceed from 1214 to 1215, where operations can be applied to update the current estimated frequency offset, based on the present value of the current estimated frequency offset from 1210, applied above at 1209, and the instantaneous frequency offset generated at 1214. Operations at 1215 for updating the current estimated frequency offset can include applying a recursive filter operation, as described above. The recursive filter update at 1215 can be performed, for example, by a particular frequency offset tracking configuration of the FIG. 9 one-pole recursive filter 900, implemented in the second processor engine 509, or in the synchronization and acquisition/tracking logic 517. As illustrated in FIG. 12, associated with the updating at 1215 the current estimated frequency offset stored in 1210 can be updated.

In an exemplary instance of the flow 1200 operations can proceed from 1215 to 1216 where operations can be applied for frequency compensating the intermediate frequency/time compensated sample sequence SF, to generate frequency/time compensated sample sequence SP. Operations can then proceed, for example from 1216 to 1217, where operations can be applied to generate an instantaneous estimated SNIR, meaning based on the most recently generated frequency/time compensated sample sequence SP. Operations at 1217 can include, for example, determining a first moment or mean, and a second moment or variance, and then applying a further processing, such as represented by Equations (10)-(12), or equivalents. An exemplary instance of the flow 1200 operations can proceed from 1217 to 1218 where operations can be applied to update the SNIR. Exemplary operations at 1218 can include applying a recursive filter operation, for example, a particular SNIR tracking configuration of the FIG. 9 one-pole recursive filter 900. Such operations can be implemented in the SNIR processing engine 509, or in the synchronization and acquisition/tracking logic 517.

Figure 13:
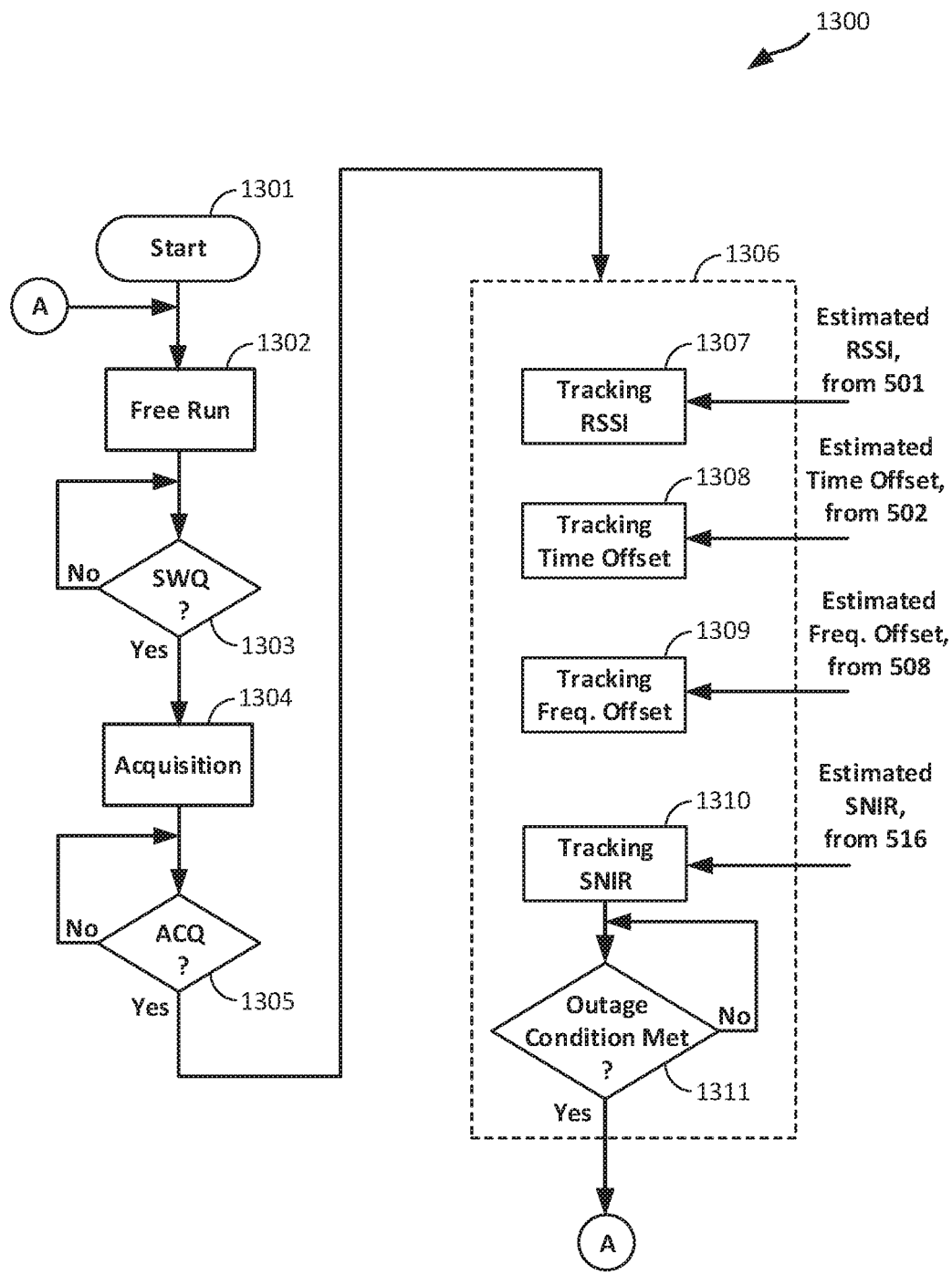
FIG. 13 illustrates a flow of exemplary operations in a process of tracking and acquisition control, in a process of partial burst demod, signal quality estimation and tracking, in one or more implementations of systems and methods for partial burst demod, signal quality estimation, and tracking according to various aspects of the present disclosure.

FIG. 13 illustrates a flow 1300 of exemplary operations in a process of tracking and acquisition control, in a process of partial burst demod, signal quality estimation and tracking, in one or more implementations of systems and methods for partial burst demod, signal quality estimation, and tracking according to various aspects of the present disclosure.

An exemplary instance of the flow 1300 will be described as arbitrarily starting from 1301, e.g., a power-up event, and assumes a default start state to be an outage state 1302. In an instance of a process according to the flow 1300, upon an event such as, for example, receipt at 1303 of a switch-to-acquisition command, SWQ, the flow can proceed to the acquisition state at 1304. The flow 1300 can then perform a loop, or wait-state, until receipt at 1305 of an acquisition success notice AQN. The AQN can be generated, for example, by a matched filter search process finding an instance of the reference symbol pattern. In an exemplary instance of a process according to the flow 1300, upon receiving notice of acquisition at 1305, the flow can proceed to 1306 and operate in a tracking state. Operations at 1306 can include tracking operations, such as tracking at 1307 of the RSSI generated by the gain control engine 501, tracking at 1308 of the time offset generated by the first processing engine 502, and tracking at 1309 of the estimated frequency generated by the second processing engine 509. Operations at 1306 can also include tracking, at 1310 of the SNIR output from the SNIR processing logic 509. In an implementation, the SNIR tracking at 1309 can include an outage detection loop at 1311. Specific configuration as to an SNIR outage detection condition at 1311 can be application specific. As described above, one non-limiting example can be a detection of the tracked SNIR falling below a pre-configured threshold value, TR, for an integer CF consecutive frames.

Referring to FIG. 13, in an instance of a process according to the flow 1300, upon detecting at 1311 an outage condition, the flow 1300 can proceed to can return to the free run mode at 1302.

Figure 14:
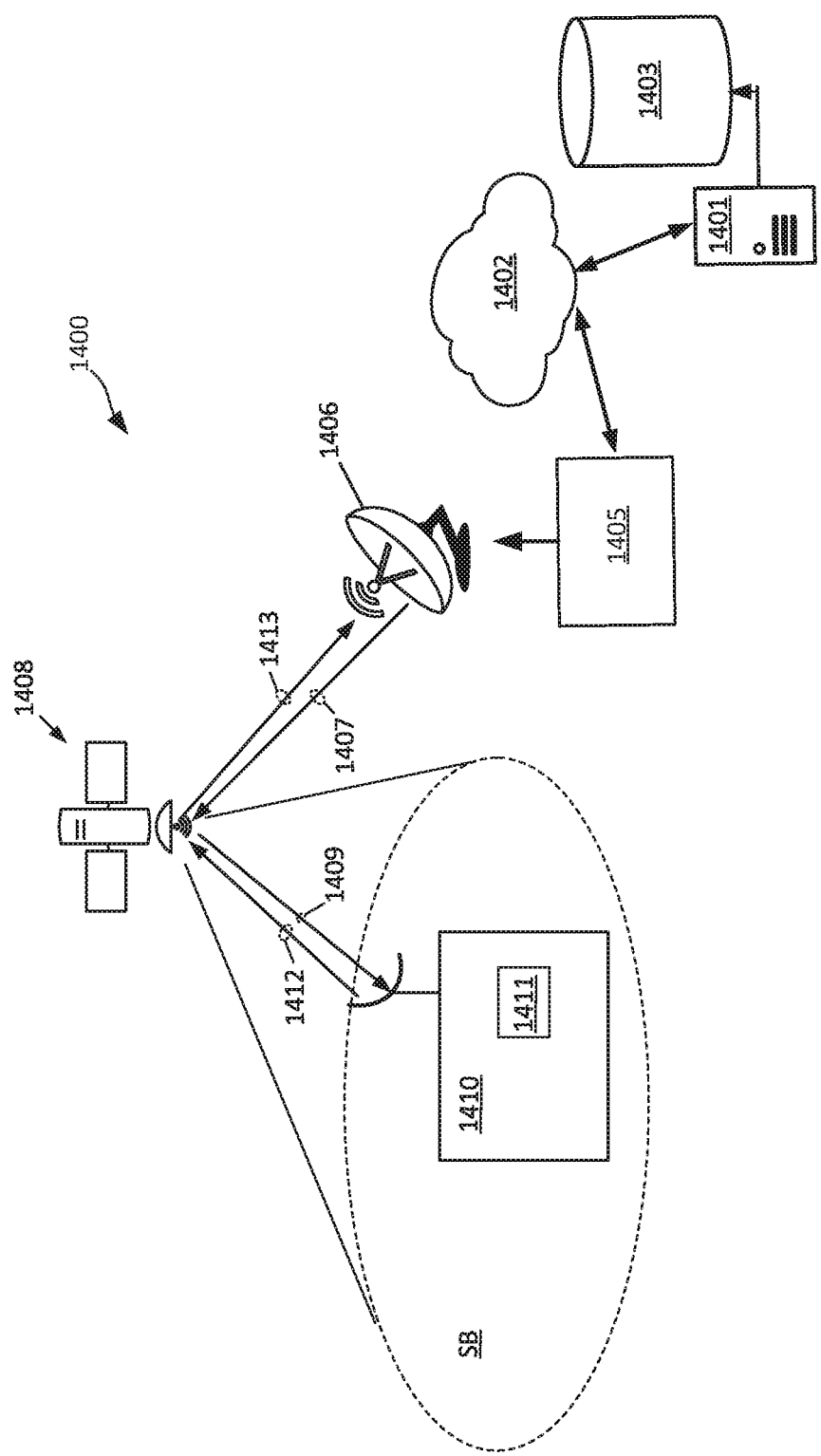
FIG. 14 illustrates an exemplary satellite communication system in which systems and methods of communication with signal quality estimation and tracking can be practiced, in one or more implementations of systems and methods according to various aspects of the present disclosure.

FIG. 14 illustrates a simplified functional block diagram of an exemplary satellite communication system 1400 in which various methods and systems of partial burst demod, signal quality estimation and tracking and aspects thereof, can be implemented. The satellite communication system 1400 can include a content host server 1401 configured to interface to a wide area network (WAN) 1402, e.g., the Internet, for functions that can include transmitting content, for example from a content storage 1403, through the WAN 1404, to a satellite gateway server 1405, coupled to an uplink transmitter 1406 for uplink 1407 to a satellite 1408. The satellite gateway server 1405 can perform satellite uplink protocol operations and provide a resulting satellite telemetry protocol compliant packet stream to the satellite 1408. The satellite 1408 can be, for example, a space-borne High Throughput Satellite (HTS) configured to transmit data to a plurality of narrowly focused regional spot beams. The satellite 1408 can in turn, in a bent-pipe satellite communication configuration, transmit a corresponding telemetry protocol satellite downlink signal 1409, as frames that can include reference symbol pattern slots (not separately visible in FIG. 14) to a plurality of narrowly focused regional spot beams. A portion of one of the spot beams, labeled "SB," is visible in FIG. 14. A VSAT terminal receiver (or transceiver) 1410 can be located in the spot beam SB and can include a partial burst SQE and sync system 1411, structured and configured, for example, according to the FIG. 5 partial burst SQE and sync system 500. VSAT terminal receiver can be configured to provide a reverse uplink 1412, e.g., a control uplink, to the satellite 1408 for communication as a reverse downlink 1413 to the satellite gateway server 1405.

In some implementations, more than one satellite may be used, or other types of satellites may be used, including, but not limited to, Fixed Satellite Service (FSS) High Throughput Satellite (HTS). In some implementations, satellite 1408 can be configured to receive data from one or more gateway stations for retransmission via spot beams to remote sites located within cells defined by the spot beams.

Figure 15:
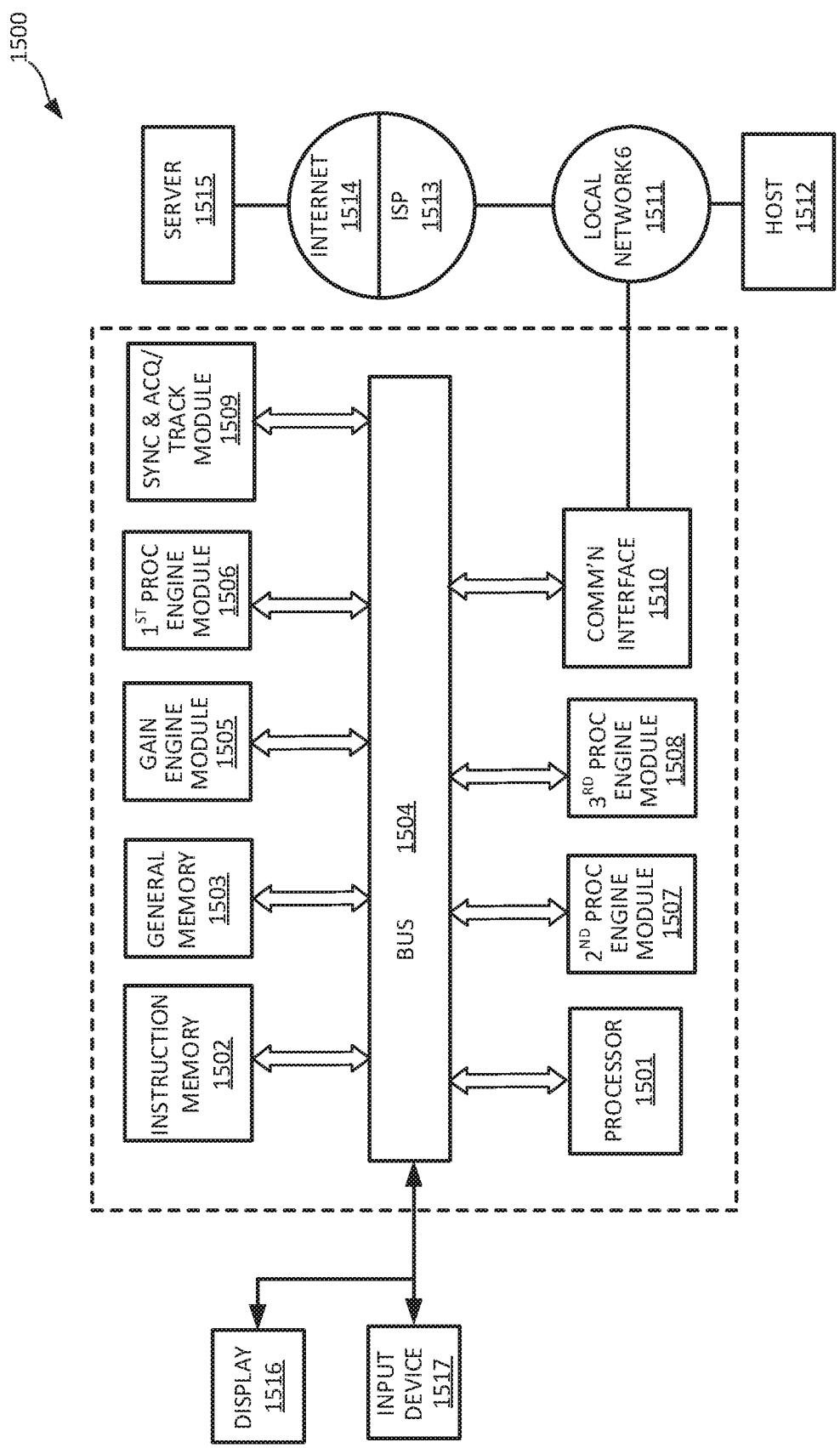
FIG. 15 is a functional block diagram of an example computer system upon which aspects of this disclosure may be implemented.

FIG. 15 is a block diagram illustrating a computer system 1500 upon which aspects of this disclosure may be implemented, such as, but not limited to, particular logic blocks and specific engines described in reference to FIGS. 5-9, and processes described in reference to FIGS. 12 and 13. It will be understood that logic blocks illustrated in FIG. 15 represent functions, and do not necessarily correspond to particular hardware on a one-to-one basis.

The computer system 1500 can include a data processor 1501, instruction memory 1502, and a general purpose memory 1503, coupled by a bus 1504. The instruction memory 1502 can include a tangible medium retrievably storing computer-readable instructions, labeled as "gain control module" 1505, that when executed by the data processor 1501 cause the processor to perform functions, processes, and operations such as the described above as provided by the FIG. 5 gain control engine 501, and computer-readable instructions, labeled as "first processing engine module" 1506, that when executed by the data processor 1502 cause the processor to perform functions, processes, and operations such as described above in reference to the FIG. 5 first processing engine 502. The instruction memory 1502 can also store, on the tangible medium, computer-readable instructions, labeled as "second processing engine module" 1507 and "$3^{rd}$ processing engine module" 1508, that when executed by the data processor 1502 cause the processor to perform functions, processes, and operations such as described above in reference to the second processing engine 509 and SNIR processing engine 510, respectively. The instruction memory 1502 can also include a tangible medium retrievably storing computer-readable instructions, labeled as "synchronization and acquisition/tracking module" 1509, that when executed by the data processor 1502 cause the processor to perform functions, processes, and operations, such as described above in reference to the FIG. 5 acquisition and tracking control logic 517.

The computer system 1500 can include a communications interface 1510, configured to interface with a local network 1511 for accessing a local server 1512, and to communicate through an Internet service provider (ISP) 1513 to the Internet 1514, and access a remote server 1515. The computer system 1500 can also include a display 1516 and a user interface 1517, either as separate devices or combined, for example, as a touchscreen display.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracing of such subject matter is hereby disclaimed.

Except as expressly stated above, no statement herein is intended or should be interpreted to cause a dedication of any component, step, feature, object, benefit, advantage, or equivalent thereof to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, or apparatus comprising the element.

The Abstract of the Disclosure is provided to allow the reader to quickly identify aspects of the disclosed subject matter. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for estimating a received signal quality, comprising:
   a memory, configured to store a reference symbol pattern;
   a first processing engine, configured to:
      receive a sampling sequence, corresponding to a sampling of reference symbol slots of a received signal burst,
      estimate a time offset between a local clock and a timing of symbols carried by the reference symbol slots, based at least in part on the stored reference symbol pattern and the sampling sequence, and
      time correct the sampling sequence to form a time corrected sample sequence of symbols carried by the reference symbol slots, based at least in part on the estimated time offset;
   a second processing engine, coupled to the memory and to the first processing engine, and configured to:
      estimate a frequency offset between the symbols carried by the reference symbol slots and a local clock, based at least in part on the stored reference symbol pattern and the time corrected sample sequence, and
      frequency compensate the time corrected sample sequence, to generate a frequency/time compensated sample sequence, based at least in part on the time corrected sample sequence and the stored reference symbol pattern; and
   a third processing engine, configured to generate a signal to noise plus interference ratio (SNIR) data, based at least in part on a statistical moment of the frequency/time compensated sample sequence and, based at least in part on the SNIR data, generate an estimated received signal quality data.

2. The system of claim 1, wherein:
   the reference symbol slots include first reference symbol slots and second reference symbol slots, spaced apart by a spacing less than a burst period, and
   the sampling sequence includes samples of the first reference symbol slots concatenated with samples of the second reference symbol slots.

3. The system of claim 1, wherein:
   the first processing engine is further configured to estimate the time offset further based at least in part on a cross-correlation of the reference symbol pattern and the sampling sequence, and the second processing engine is further configured to estimate the frequency offset by operation that functions to:
   frequency correct the time corrected sample sequence to form an intermediate time/frequency compensated sample sequence, based on a removing of a current estimated frequency offset from the time corrected sample sequence,
   determine a new estimated phase, based at least in part on the intermediate time/frequency compensated sample sequence and the reference symbol pattern,
   estimate an instantaneous frequency offset, based at least in part on the new estimated phase and an estimated phase from a preceding burst, and
   generate the estimated frequency offset based at least in part on the estimated instantaneous frequency offset.

4. The system of claim 3, wherein the second processing engine is further configured to update the current estimated frequency offset, based on a recursive filtering, based on the instantaneous estimated frequency offset data, the current estimated frequency offset data, and an alpha multiplier.

5. The system of claim 3, wherein the second processing engine is further configured to:
   determine the estimated new phase based, at least in part, on a multiplication of the time/frequency compensated sample sequence by a conjugate of the reference symbol pattern, and
   update the current estimated frequency offset based at least in part on a multiplication product, the multiplication product being a multiplication of the current burst estimated phase by a conjugate of a preceding burst estimated phase.

6. The system of claim 3, wherein:
   the sequence of samples includes a sequence of G samples, $SR(g)$, $g=0, 1, \ldots G-1$, G being an integer, and g being an index,
   the first processing engine includes a coarse time offset estimation logic and a fine time offset estimation logic,
   the coarse time offset estimation logic is configured to determine, as an index position of maximum cross-correlation, a g index value at which a sliding window within the sequence of G samples, $SR(g)$, $g=0, 1, \ldots G-1$, has a relative maximum cross-correlation with the reference symbol pattern,
   the fine time offset estimation logic is configured to estimate a time of maximum cross-correlation, based at least in part on an interpolation based at least in part on a magnitude of the relative maximum cross-correlation and a magnitude of a cross-correlation, to the reference symbol pattern, of the sliding window at an index value adjacent to the index position of maximum cross-correlation, and
   the first processing engine is further configured to generate the estimated time offset based at least in part on the estimated time of maximum cross-correlation.

7. The system of claim 6, wherein the first processing engine further includes a sample interpolation logic, the sample interpolation logic being configured to:
   form the time corrected sample sequence by a time shift of samples among the sequence G samples, the samples corresponding to the index position of maximum correlation, wherein the time shift is based at least in part on a linear interpolation of the of samples among the sequence G samples, the linear interpolation being based at least in part on the estimated time of maximum cross-correlation, and generate the time corrected sample sequence further based, at least in part, on a decimation of the samples among the sequence G samples.

8. The system of claim 1, wherein
the system further includes a gain adjustment logic, coupled to the memory and coupled to the first processing engine, the second processing engine, or the third processing engine, or any combination or subcombination thereof, the gain adjustment logic being configured to:
receive a sequence of raw samples, the sequence of raw samples reflecting a sampling of the reference symbol slots,
calculate a plurality of magnitude data, each magnitude data based at least in part on a squaring of a corresponding one of the raw samples,
generate an estimated received signal strength indicator (RSSI) data, based at least in part on the plurality of magnitude data,
generate an updated gain data, based at least in part on the generated estimated received signal strength data, and
generate the sample sequence based on applying a gain adjustment to the sequence of the raw samples, the gain adjustment being based at least in part on the updated gain data.

9. The system of claim 1, wherein the system further includes a tracking/acquisition management logic, wherein the tracking/acquisition management logic is configured as switchable among a tracking mode, a stop mode, and an acquisition mode, wherein:
in the tracking mode the tracking/acquisition management logic is configured to:
apply a tracking loop, the tracking loop including a generating, based at least in part on a recursive filtering of the estimated SNIR data, of a tracked SNIR data, and
upon detecting an outage condition, to stop the tracking loop, the outage condition based at least in part on the tracked SNIR data, and switching to the stop mode;
in the stop mode, the tracking/acquisition management logic is configured to switch to the acquisition mode upon receipt of an acquisition mode command; and
in the acquisition mode, the tracking/acquisition management logic is configured to apply a burst detection process and, upon a burst detection by the burst detection process, to switch to the tracking mode.

10. A method for estimating a received signal quality, comprising:
receiving a sampling sequence, corresponding to a sampling of reference symbol slots of a received signal burst;
estimating a time offset between a local clock and a timing of symbols carried by the reference symbol slots, based at least in part on the stored reference symbol pattern and the sampling sequence;
time correcting the sampling sequence to form a time corrected sample sequence of symbols carried by the reference symbol slots, based at least in part on the estimated time offset;
estimating a frequency offset between the symbols carried by the reference symbol slots and a local clock, based at least in part on the stored reference symbol pattern and the time corrected sample sequence;
frequency compensating the time corrected sample sequence, to generate a frequency/time compensated sample sequence, based at least in part on the time corrected sample sequence and the stored reference symbol pattern; and
generating a signal to noise plus interference ratio (SNIR) data, based at least in part on a statistical moment of the frequency/time compensated sample sequence and, based at least in part on the SNIR data, generate an estimated received signal quality data.

11. The method of claim 10, wherein:
the reference symbol slots include first reference symbol slots and second reference symbol slots, spaced apart by a spacing, the spacing being less than a burst period, and
the sampling sequence includes samples of the first reference symbol slots concatenated with samples of the second reference symbol slots.

12. The method of claim 10, wherein:
estimating the time offset is further based at least in part on a cross-correlation of the reference symbol pattern and the sampling sequence, and
wherein the method further includes:
frequency correcting the time corrected sample sequence to form an intermediate time/frequency compensated sample sequence, based on a removing of a current estimated frequency offset from the time corrected sample sequence,
determining a new estimated phase, based at least in part on the intermediate time/frequency compensated sample sequence and the reference symbol pattern,
estimating an instantaneous frequency offset, based at least in part on the new estimated phase and an estimated phase from a preceding burst, and
generating the estimated frequency offset based at least in part on the estimated instantaneous frequency offset.

13. The method of claim 12, wherein the method further includes:
updating the current estimated frequency offset, based on a recursive filtering, based on the instantaneous estimated frequency offset data, the current estimated frequency offset, and an alpha multiplier.

14. The method of claim 12, wherein the method further includes:
determining the estimated new phase based, at least in part, on a multiplication of the time/frequency compensated sample sequence by a conjugate of the reference symbol pattern, and wherein:
generating the instantaneous estimated frequency offset data is based at least in part on a multiplication of the current burst estimated phase by a conjugate of a preceding burst estimated phase.

15. The method of claim 12, wherein:
the sequence of samples includes a sequence of G samples, $SR(g)$, $g=0, 1, \ldots G-1$, G being an integer, and g being an index,
estimating the time offset includes:
a coarse time offset estimation, the coarse time offset estimation including determining, as an index position of maximum cross-correlation, a g index value at which a sliding window within the sequence of G samples, $SR(g)$, $g=0, 1, \ldots G-1$, has a relative maximum cross-correlation with the reference symbol pattern, and
a fine time offset estimation, the fine time offset estimation including estimating a time of maximum across-correlation, based at least in part on an interpolation based at least in part on a magnitude of the relative maximum cross-correlation and a magnitude of a cross-correlation, to the reference symbol pattern, of the sliding window at an index value adjacent the index position of maximum cross-correlation, and estimating the time offset based at least in part on the estimated time of maximum cross-correlation.

16. The method of claim 15, wherein forming the time corrected sample sequence includes:
time shifting samples among the sequence G samples, the samples corresponding to the index position of maximum correlation, to generate a sequence of time shifted samples, wherein:
the time shifting is based at least in part on a linear interpolation of the samples among the sequence G samples, the linear interpolation being based at least in part on the estimated time of maximum cross-correlation, and
generating the time corrected sample sequence further based, at least in part, on a decimation of the samples among the sequence G samples.

17. The method of claim 10, wherein the method further includes receiving a sequence of raw samples reflecting a sampling of the reference symbol slots;
calculating a plurality of magnitude data, each magnitude data based at least in part on a squaring of a corresponding one of the raw samples;
generating an estimated received signal strength indicator (RSSI) data, based at least in part on the plurality of magnitude data;
generating an updated gain data, based at least in part on the generated estimated received signal strength data; and
generating the sample sequence based on applying a gain adjustment to the sequence of the raw samples, the gain adjustment being based at least in part on the updated gain data.

18. The system of claim 10, wherein the method further includes:
tracking, wherein the tracking includes:
applying a tracking loop, the tracking loop including a generating, based at least in part on a recursive filtering of the estimated SNIR data, of a tracked SNIR data;
upon detecting an outage condition, stopping the tracking loop and switching to a stop mode, detecting the outage condition being based at least in part on the tracked SNIR data;
upon switching to the stop mode, switching to an acquisition mode upon receipt of an acquisition mode command; and upon switching to the acquisition mode, applying a burst detection process and, upon a burst detection by the burst detection process, switching to the tracking mode.

19. A non-transitory computer-readable medium storing instructions which, when executed by a computer, cause the computer to:
receive a sampling sequence, corresponding to a sampling of reference symbol slots of a received signal burst;
estimate a time offset between a local clock and a timing of symbols carried by the reference symbol slots, based at least in part on the stored reference symbol pattern and the sampling sequence;
time correct the sampling sequence to form a time corrected sample sequence of symbols carried by the reference symbol slots, based at least in part on the estimated time offset;
estimate a frequency offset between the symbols carried by the reference symbol slots and a local clock, based at least in part on the stored reference symbol pattern and the time corrected sample sequence;
frequency compensate the time corrected sample sequence, to generate a frequency/time compensated sample sequence, based at least in part on the time corrected sample sequence and the stored reference symbol pattern; and
generate a signal to noise plus interference ratio (SNIR) data, based at least in part on a statistical moment of the frequency/time compensated sample sequence and, based at least in part on the SNIR data, generate an estimated received signal quality data.

20. The non-transitory computer-readable medium of claim 19, the instruction further including instructions which, when executed by the computer, cause the computer to:
estimate the time offset further based at least in part on a cross-correlation of the reference symbol pattern and the sampling sequence;
frequency correct the time corrected sample sequence to form an intermediate time/frequency compensated sample sequence, based on a removing of a current estimated frequency offset from the time corrected sample sequence;
determine a new estimated phase, based at least in part on the intermediate time/frequency compensated sample sequence and the reference symbol pattern;
estimate an instantaneous frequency offset, based at least in part on the new estimated phase and an estimated phase from a preceding burst, and
generate the estimated frequency offset based at least in part on the estimated instantaneous frequency offset.

* * * * *